US012783769B2

(12) United States Patent
Allmeling

(10) Patent No.: US 12,783,769 B2
(45) Date of Patent: Nov. 3, 2026

(54) METHOD AND APPARATUS FOR SIMULATING AN ELECTRICAL CIRCUIT, DIGITAL REAL-TIME SIMULATOR, COMPUTER PROGRAM AND COMPUTER-READABLE MEDIUM

(71) Applicant: Plexim GmbH, Zürich (CH)

(72) Inventor: Jost Allmeling, Kilchberg (CH)

(73) Assignee: Plexim GmbH, Zürich (CH)

( * ) Notice: Subject to any disclaimer, the term of this patent is extended or adjusted under 35 U.S.C. 154(b) by 554 days.

(21) Appl. No.: 18/524,750

(22) Filed: Nov. 30, 2023

(65) Prior Publication Data

US 2024/0193332 A1 Jun. 13, 2024

(30) Foreign Application Priority Data

Dec. 8, 2022 (EP) .................................... 22212271

(51) Int. Cl.
*G06F 30/3308* (2020.01)
*G06F 119/06* (2020.01)

(52) U.S. Cl.
CPC ...... *G06F 30/3308* (2020.01); *G06F 2119/06* (2020.01)

(58) Field of Classification Search
CPC ...... G06F 30/30; G06F 30/367; G06F 30/343; G06F 30/3308; G06F 30/33; G06F 2219/06
USPC ......................................................... 716/100
See application file for complete search history.

(56) References Cited

U.S. PATENT DOCUMENTS

| | | | | |
|---|---|---|---|---|
| 2017/0132337 | A1 | 5/2017 | Li | |
| 2017/0206297 | A1* | 7/2017 | Meyer | G06F 30/367 |
| 2022/0198244 | A1 | 6/2022 | He | |
| 2025/0045501 | A1* | 2/2025 | Li | G06F 30/367 |

FOREIGN PATENT DOCUMENTS

| | | |
|---|---|---|
| CN | 115 097 752 A | 9/2022 |

OTHER PUBLICATIONS

European Search Report for corresponding Application No. 22212271.5, dated May 24, 2023.

* cited by examiner

*Primary Examiner* — Paul Dinh
(74) *Attorney, Agent, or Firm* — Renner, Otto, Boisselle & Sklar, LLP

(57) ABSTRACT

A method for simulating an electrical circuit wherein the electrical circuit includes at least one half-bridge and at least one other component, the half-bridge and the at least one other component interact with each other, the half-bridge includes two switching elements, each of the two switching elements is able to attain an open position and a closed position, at most one of the two switching elements is in the closed position at any time, the at least one half-bridge is modeled by a control logic, only one single switch and a variable voltage source, the control logic controls the one single switch and the variable voltage source, the control logic is able to attain three different states for simulating the interaction between the half-bridge and the other component, and the method includes determining a current and/or voltage of the electrical circuit by means of the control logic, the one single switch and the variable voltage source.

16 Claims, 15 Drawing Sheets

METHOD AND APPARATUS FOR SIMULATING AN ELECTRICAL CIRCUIT, DIGITAL REAL-TIME SIMULATOR, COMPUTER PROGRAM AND COMPUTER-READABLE MEDIUM

CROSS-REFERENCE TO RELATED APPLICATION

This application claims priority under 35 USC § 119 to European Application No. 22 212 271.5, filed on Dec. 8, 2022, the entire disclosure of which is incorporated herein by reference.

TECHNICAL FIELD OF THE INVENTION

The invention relates to a method for simulating an electrical circuit. The invention further relates to an apparatus for simulating an electrical circuit. The invention further relates to a digital real-time simulator, a computer program and a computer-readable medium.

BRIEF DESCRIPTION OF THE RELATED ART

Electrical circuit simulation helps design engineers predict and analyze the behavior of an electrical device or system before a prototype is built. Simulation allows to create a model or virtual prototype for the device and perform tests under normal and faulty operating conditions. Since modifications to the model can be made quickly, simulation accelerates the development process and reduces time-to-market for new products.

The simulation of power electronic systems is particularly challenging because power semiconductors such as diodes, MOSFETs and IGBTs are non-linear components that exhibit sharp discontinuities when turned on and off. At the system level, the behavior of power semiconductors is best represented by ideal on/off switches. The discontinuities are typically handled using a piece-wise linear representation where a different set of differential equations is applied for each possible combination of switch positions. The current combination of switch positions is selected based on the control logic for the individual switches.

An electrical circuit consisting of components such as resistors, capacitors, inductors, transformers, sources and meters can be mathematically expressed as a set of differential equations that accurately describe the dynamics of the circuit. If the circuit is linear, these equations can be transformed into an explicit form, such as a state-space system where the state variables are the inductor currents and the capacitor voltages:

$$\dot{x} = Ax + Bu \tag{1}$$

$$y = Cx + Du \tag{2}$$

In this equation system, x is the vector of state variables, u is the input vector of controlled sources, and y is the output vector of measurements. In a time-domain simulation, the general procedure for each time step is to first solve for the state variables and then calculate the output variables. After one step is completed, the time is advanced and the process is repeated.

For linear time-invariant circuits, the matrices A . . . D are constant. However, inserting switches into the circuit causes those matrices become functions of time. If the circuit contains one or more switches each combination of switch positions yields a different linear circuit topology p and therefore a different set of equations characterized by the matrices $A_p$, $B_p$, $C_p$ and $D_p$. Having N switches the system could have $2^N$ topologies. In practice, however, not all topologies are allowed, and not all valid topologies are actually encountered during a simulation.

While in an offline simulation the different sets of matrices are typically calculated on the fly when they are needed in the course of the simulation, this is not feasible in a real-time simulation. In a real-time simulation, the calculation of a time step should always require approximately the same amount of computation time and must be completed before the wall clock time has advanced by one time step. As a consequence, all required matrices must be computed in advance and stored before the simulation is started. The memory requirement, which grows exponentially with the number of switches, limits the number N of ideal switches in practice to less than a dozen. Reducing the number of required switches to a bare minimum is therefore a paramount objective in the development of inverter models used in real-time simulations.

SUMMARY OF THE INVENTION

An objective of this invention is to contribute to an accurate simulation of an electrical circuit while maintaining a high simulation speed, in particular to reduce the number of switches required for simulating an electrical circuit comprising a half-bridge in order to lower the memory requirements for a real-time simulation.

This objective is achieved by the features of the independent claims. Advantageous embodiments of the invention are given in the sub-claims.

In a first aspect, the invention is distinguished by a method for simulating an electrical circuit.

The electrical circuit comprises at least one half-bridge and at least one other component, wherein the half-bridge and the at least one other component interact with each other.

Said half-bridge comprises two switching elements.

Each of the two switching elements is able to attain an open position and a closed position.

At most one of the two switching elements is in the closed position at any time.

The at least one half-bridge is modeled by a control logic, only one single switch and a variable voltage source.

The control logic controls the one single switch and the variable voltage source.

The control logic is able to attain three different states for simulating the interaction between the half-bridge and the other component.

The method comprises determining a current and/or voltage of the electrical circuit by means of the control logic, the one single switch and the variable voltage source.

As described above, the memory requirements grow exponentially with the number of switches. With the above method, instead of multiple switches, only one single switch is needed for each half-bridge. As a result, the memory requirements are much lower. Thus, more complex circuits can be simulated in real time or less memory is needed for the calculation.

According to one embodiment the single switch is modeled by means of an ideal switch model.

The ideal switch model represents the discontinuous behavior of power semiconductors accurately and efficiently. Thus, especially power semiconductors operating at high switching frequencies can be simulated accurately, fast and efficiently by means of the ideal switch model.

According to one embodiment the single switch is modeled by means of a discrete-time approximate switch model.

The discrete-time model has especially a fixed simulation time step T, wherein T is, for example, in the range of 0.1 μs to 10 μs, especially 0.5 μs, lys, or 2 μs.

The discrete-time approximate switch model avoids the large number of equation systems required when ideal switches are employed. Thus, more complex circuits can be simulated in real time or less memory is needed for the calculation.

According to one embodiment during the determining of the current and/or voltage a change of a currently active state of the three different states in the control logic is performed based on a voltage condition and/or current condition in the electrical circuit.

As an example, a diode is a switch that is controlled by internal control signals: The diode is closed when the voltage across the diode measured from the anode to the cathode becomes positive. The diode opens when the measured current through the diode becomes negative.

According to one embodiment during the determining of the current and/or voltage a change of a currently active state of the three different states in the control logic is performed based on an external control signal.

The external control signal is a control signal generated outside the electrical circuit.

For example, a MOSFET is a switch that is controlled by an external control signal: The MOSFET is in the closed position (on) if and only if the external gate signal is active. Otherwise, the MOSFET is in the open position (off).

According to one embodiment during the determining of the current and/or voltage a change of a currently active state of the three different states in the control logic is performed based on multiple external control signals, wherein each external control signal represents a signal that controls one distinct switching element of the switching elements of the half-bridge.

According to one embodiment the switching elements of the half-bridge are representative for power semiconductors and the three different states of the control logic are used to simulate a first state in which a first semiconductor of the half-bridge is in the open position and a second semiconductor of the half-bridge is in the closed position, a second state in which the first semiconductor is in the closed position and the second semiconductor is in the open position, and a third state in which the first semiconductor and the second semiconductor are in the open position.

According to one embodiment the switching elements of the half-bridge are representative for diodes.

According to one embodiment the control logic comprises a state machine for attaining the three different states.

According to one embodiment the control logic comprises one or more voltage inputs and, depending on a currently active state of the three different states of the control logic, the control logic applies one of the voltage inputs with a corresponding polarity to the variable voltage source.

According to one embodiment the control logic comprises one or more current outputs and, depending on a currently active state of the three different states of the control logic, the control logic applies a current value with a corresponding polarity to one of the current outputs, wherein the current value is a current measured through the single switch. The other current outputs are especially set to zero.

According to one embodiment the single switch is modelled by an equivalent circuit comprising a fixed-value resistor and at least one of a controlled current source or a controlled voltage source, the single switch is able to attain an open position and a closed position, the open position is simulated by means of an open-state controller, wherein the open-state controller is configured to control the current or voltage source and the open-state controller comprises a filter.

The open-state controller may also comprise multiple filters, for example, 2 to 10, especially 4, 5 or 6.

By means of the open-state controller the open position of the single switch can be simulated with sufficient accuracy, while the required computing power is minimized and kept constant for all simulation steps, so that real-time simulation of complex electrical circuits is possible with both high fidelity and low latency. Due to the filter, spurious oscillations are minimized.

According to one embodiment an input of the open-state controller is based on a current or voltage determined in the electrical circuit. The current or voltage determined in the electrical circuit can also be named current or voltage measurement although it is not a real measurement as it is only an internal determination inside the simulation. Due to the internal measurement as a feedback signal, a closed control loop is formed which is stable and robust against external disturbances.

According to one embodiment the open-state controller is a discrete-time model.

The discrete-time model has especially a fixed simulation time step T, wherein T is, for example, in the range of 0.1 μs to 10 μs, especially 0.5 μs, 1 μs, or 2 μs.

According to one embodiment the filter is a low-pass filter or a band-pass filter.

Especially the use of a low-pass filter or a band-pass filter leads to a robust and sufficiently accurate simulation which minimizes spurious oscillations.

According to one embodiment the filter is a first-order filter.

By using a first-order filter, the required computing power is reduced, allowing very fast real-time simulation of complex electrical circuits.

According to one embodiment the open-state controller further comprises an integrator and the open-state controller output is the weighted sum of the integrator output and the filter output.

According to one embodiment the sum of all weights in the weighted sum is greater than zero and less than two.

If the sum is between 0 and 2, the simulation becomes stable irrespective of the remaining circuit and the choice of other parameters, so that a robust performance is achieved. The sum of all weights is preferably 1, or lies between 0.5 and 1.5.

According to one embodiment the open-state controller comprises multiple filters, and a smallest weight of the multiple filters and a largest weight of the multiple filters do not differ by more than a factor of two.

In order to attenuate oscillations over a wide frequency range, it is advantageous to use similar gains $k_m$ for all filters.

For example, the weights of the multiple filters are substantially the same, for example the weights are 1/(M+1), where M is the number of filters, wherein substantially means that the single weights may slightly differ from each other, for example by 5% or 10% or 20%.

According to one embodiment the open-state controller comprises multiple filters, and cutoff frequencies of the multiple filters are logarithmically distributed over a given frequency range.

In order to attenuate oscillations over a wide frequency range, it is advantageous to distribute the cutoff frequencies logarithmically across the frequency range of interest. Therefore, the damping coefficients of the filters may, for example, be determined according to the formula $1-\frac{1}{4}^{m}$ where m is an increment starting at 1 to M and M is the number of filters.

According to one embodiment the current and/or voltage is determined by means of at least one set of time-invariant equations.

According to one embodiment the current and/or voltage is determined using a discrete-time inversion-free solver with a fixed simulation time step T.

According to one embodiment the single switch in the closed position is simulated by means of a closed-state controller and during the determining of the current and/or voltage a change-over between the open-state controller and the closed-state controller is performed based on a change of a currently active state of the three different states in the control logic.

Due to this, not only a half-bridge with the single switch in an open position can be simulated, but also the change to the switch in the closed position, and of course also the change back to the open position, so that the half-bridge can be simulated with the single switch in all positions.

According to one embodiment the half-bridge comprises a mechanical switch and/or a power semiconductor.

Mechanical switches comprise, for example, a circuit breaker and/or a contactor and/or a relay and/or a manual switch.

Power semiconductors comprise, for example, a diode, and/or a thyristor and/or a TRIAC (triode for alternating current) and/or a GTO (gate turn-off thyristor) and/or an IGCT (integrated gate-commutated thyristor) and/or an IGBT (insulated-gate bipolar transistor) and/or a MOSFET (metal-oxide-semiconductor field-effect transistor).

According to one embodiment the other component in the electrical circuit is a passive component or an active component. The passive component can be an inductor and/or a capacitor and/or a resistor and/or a transformer. The active component can be, for example, a voltage/current source and/or a switch and/or a semiconductor.

In a further aspect, the invention is distinguished by a data processing apparatus comprising means for carrying out the method of the first aspect.

The above-described embodiments and advantages with regards to the method are also valid for the data processing apparatus.

In a further aspect, the invention is distinguished by a digital real-time simulator, wherein the digital real-time simulator comprises the data processing apparatus.

The real-time simulator is a device that emulates the behavior of a physical system or apparatus with the same speed as the wall clock time. In other words, when the simulation clock reaches a certain time in a real-time simulation, the same time has elapsed in the real world. The digital real-time simulator contains, for example, a processing unit such as a CPU, GPU, FPGA to compute a mathematical model of the physical system. The model is usually expressed in the form of differential equations.

The real-time simulator comprises, for example, high-speed digital and analog inputs and outputs (I/O) to which other technical equipment can be connected. The digital inputs can be used to read control signals. These signals can be, for example, pulses to drive the semiconductors in a switching power converter that is simulated in the real-time simulator. Voltage and current values calculated by the real-time simulator can be made accessible via the analog outputs.

The real-time simulator may be employed to test and validate control equipment without a physical plant. The actual plant, i.e. the controlled system, is replaced by an appropriate dynamic model computed on the real-time simulator. Since the control equipment is embodied as electronic hardware, this use case is referred to as hardware-in-the-loop (HIL) testing. HIL simulations allow testing both the control hardware and software in a safe environment.

The above-described embodiments and advantages with regards to the method are also valid for the digital real-time simulator.

In a further aspect, the invention is distinguished by a computer program comprising instructions which, when the program is executed by a computer, cause the computer to carry out the method of the first aspect.

In a further aspect, the invention is distinguished by a computer-readable medium comprising instructions which, when executed by a computer, cause the computer to carry out the method of the first aspect.

BRIEF DESCRIPTION OF THE DRAWINGS

Exemplary embodiments of the invention are explained in the following with the aid of schematic drawings.

These are as follows.

DETAILED DESCRIPTION OF THE INVENTION

Elements of same structure or type are described with the same reference signs throughout the figures.

Figure 1:
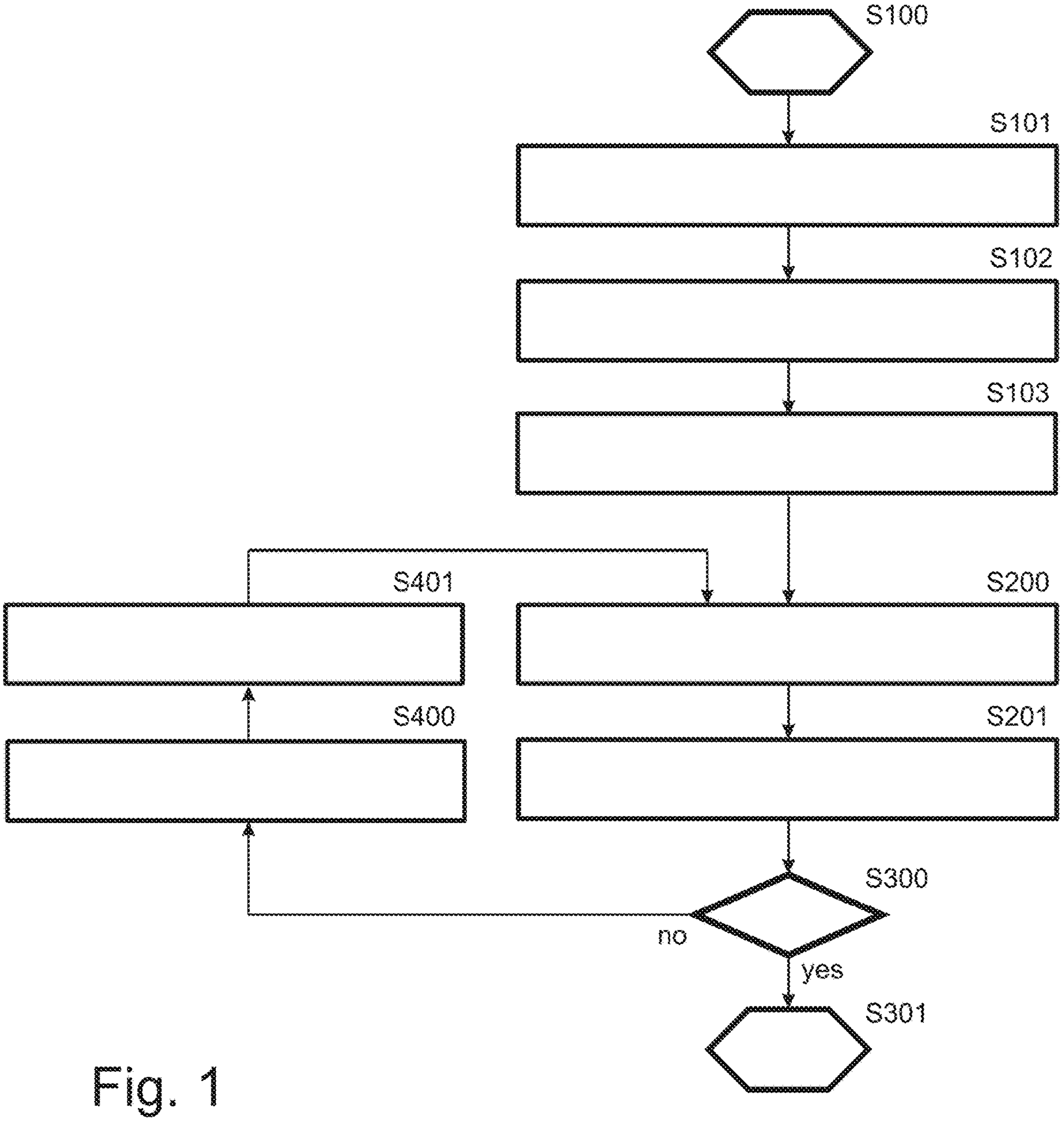
FIG. 1 a flowchart for simulating an electrical circuit.

FIG. 1 shows a flowchart of a program for simulating an electrical circuit. The program can be executed by a data processing apparatus.

The apparatus can be implemented, for example, in a computer comprising a processing unit, a program and/or data memory and one or more communication interfaces.

The computer can be, for example, a digital real-time simulator.

The digital real-time simulator contains a processing unit such as a CPU, GPU, FPGA to compute a mathematical model of the physical system.

In the program an electrical circuit is simulated. The electrical circuit comprises at least one half-bridge and at least one other component, wherein the half-bridge and the at least one other component interact with each other.

Said half-bridge comprises two switching elements. Each of the two switching elements is able to attain an open position and a closed position. At most one of the two switching elements is in the closed position at any time. The at least one half-bridge is modeled by a control logic, only one single switch and a variable voltage source. The control logic controls the one single switch and the variable voltage source. The control logic is able to attain three different states for simulating the interaction between the half-bridge and the other component. The program comprises determining a current and/or voltage of the electrical circuit by means of the control logic, the one single switch and the variable voltage source. For the determination, the method comprises, for example, the following steps.

In a step S100 the program is started and, for example, a discretization time step T and the simulation end time are chosen. In the following the discretization time step T may also be named simulation time step T.

In a step S101, the at least one half-bridge, especially multiple half-bridges in the electrical circuit are each replaced with the control logic, the single switch and the variable voltage source.

In a step S102, based on the electrical circuit, a set of differential equations is calculated that mathematically describe the electrical circuit.

In a step S103, variables such as inductor currents and capacitor voltages as well as switch positions are initialized.

In a step S200, a simulation step is computed using the previously computed set of differential equations. A current and/or voltage of the electrical circuit is determined depending on the position of the single switch and the variable voltage source representing each half-bridge.

In a step S201, the simulation time is increased by the discretization time step T.

In a step S300 a decision is made to end the simulation, for example because the simulation end time has been reached, or to compute another simulation step.

In a step S400, the currently active state of the three different states in the control logic is determined for each half-bridge. The decision is based on internal measurements and/or external control signals.

In a step S401, for each half-bridge the current position of the one single switch and the applicable voltage of the variable voltage source are determined by means of the control logic.

The sequence consisting of steps S200, S201, S300, S400 and S401 can be executed multiple times.

In a step S301 the program is stopped and can be started again in step S100.

In the following, the control logic is explained in more detail.

As explained further above, in an offline simulation the different sets of matrices representing the electrical circuit are typically calculated on the fly when they are needed during the simulation; this is not feasible in a real-time simulation. In a real-time simulation, the calculation of a time step should always require approximately the same amount of computation time and must be completed before the wall clock time has advanced by one time step. Thus, all required matrices must be computed in advance and stored before the simulation is started. Since the number of matrices and hence the memory requirements grow exponentially with the number of switches, reducing the number of switches required for modeling inverters is a primary objective in real-time simulations.

Figure 2:
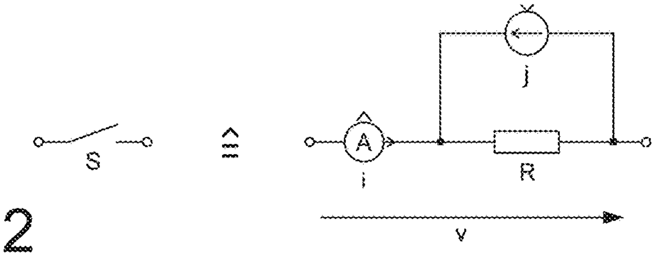
FIG. 2 an approximate switch model.

A way to circumvent the large number of equation systems is to represent power semiconductors not by ideal switches, but by a fixed-value resistor R connected in parallel to a variable current source j as depicted in FIG. 2.

This implementation may also be called associated discrete circuit (ADC) switch model or discrete-time approximate switch model. Since a resistor is a linear component, only a single set of constant matrices A . . . D is required.

To make the resistor behave like an ideal switch, it is advantageous if the current source is controlled according to the following objectives: When the switch is in the open position (s=0), the steady-state current i through the switch shall be zero. When the switch is in the closed position (s=1), the voltage v across the switch shall be zero.

In an iteration-free fixed-step solver, the computation of the source current $j_{n+1}$ at the new simulation step n+1 can only be based on measurements at previous simulation steps n or earlier. It is assumed that for a small time step $T=T_{n+1}-t_n$ the switch current and voltage do not change much between two consecutive simulation steps:

$$i_{n+1} \approx i_n \quad (3)$$

$$v_{n+1} \approx v_n \quad (4)$$

Based on this assumption, the following calculation rule may be proposed to approximate the ideal switch characteristic.

$$j_{n+1} = \begin{cases} -i_n & \text{if } s_{n+1} = 1, \\ i_n + j_n & \text{if } s_{n+1} = 0. \end{cases} \quad (5)$$

If a switch is implemented with the rule suggested in Eqn. 5, the approximation makes a closed switch (short circuit) behave like a small inductance $$L_{on} = RT \quad (6)$$

and an open switch (open circuit) like a small capacitance $$C_{off} = T/R \quad (7)$$

with T being the discretization time step.

However, in inductive networks, which are typical for power electronic circuits, the capacitance $C_{off}$ forms a resonator with the inductances in the circuit which leads to spurious oscillations, respectively unwanted overvoltages and overcurrents. The above assumptions can also be applied to multiple switches.

It is possible to reduce oscillations further by making the switch in the open position behave like a series-connected $R_{off}C_{off}$ circuit instead of a pure capacitor $C_{off}$. In this approach, only a fraction k of the resistor R is used to represent the equivalent capacitor $C_{off}$ $$C_{off} = T/(kR) \quad (8)$$

while the remainder is used for damping purposes:

$$R_{off} = (1-k)R \quad (9)$$

Thanks to the equivalent resistor $R_{off}$, the excited oscillations decay faster, but the damping effect is limited as $R_{off}$ cannot become larger than R.

Figure 3:
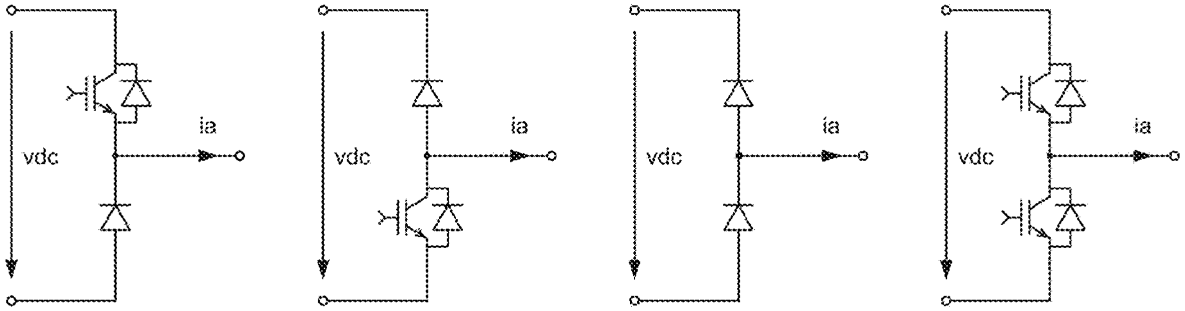
FIG. 3 different half-bridges.

In power electronic applications, many inverter-converter systems such as buck converters, boost converters, diode rectifiers and voltages source inverters (VSIs) can be realized with inverter half-bridges as depicted in FIG. 3. These half-bridges consist of series-connected power semiconductors, each of which can be a naturally commutated device (e.g. a diode), a forced commutated device (e.g. an IGBTs) or a combination of both.

In most applications, the half-bridges are connected on the DC side to a capacitor or voltage source. Under normal operation it can be assumed that the DC voltage $v_{dc}$ is positively biased, since otherwise the diodes would short circuit the DC link. During operation, the phase terminal is either switched to the positive or negative DC link voltage or remains unconnected.

Figure 4:
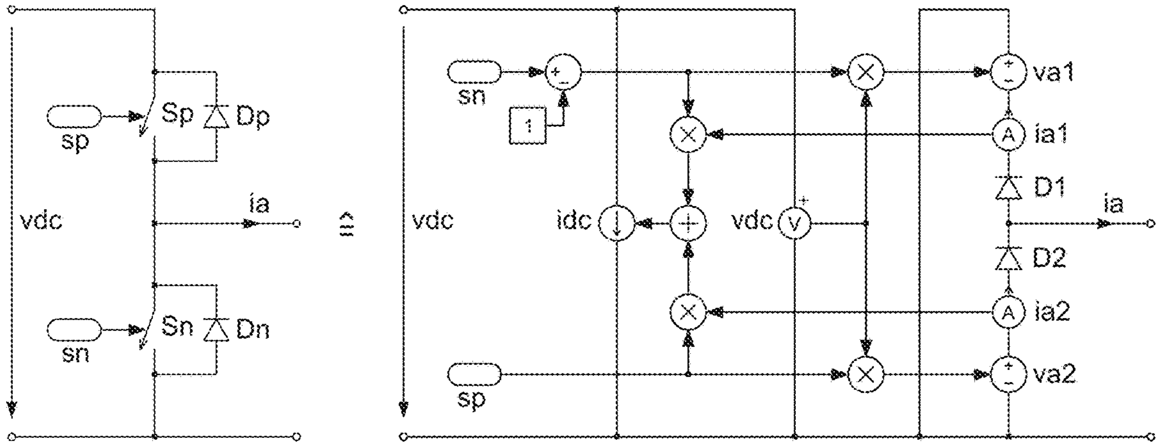
FIG. 4 a sub-cycle average model for a VSI half-bridge.

Such half-bridges may be modelled with a combination of two series connected diodes and multiple controlled voltage and current sources in order to increase the fidelity of real-time simulations. This modeling approach, termed sub-cycle averaging, is illustrated in FIG. 4 for a VSI half-bridge. The voltage sources va1 and va2 are controlled by the switching signals sp and sn. They apply the DC voltage vdc to the phase side.

Likewise, the current source idc is controlled by the same switching signals applying the phase current ia1 resp. ia2 to the DC side.

The two diodes D1 and D2 are used to simulate natural commutation and discontinuous conduction mode (DCM). Depending on the direction of the phase current, the lower diode D1 or the upper diode D2 will conduct applying the corresponding phase voltage and DC current. If none of the diodes conduct, the half-bridge has entered DCM, which means ia is zero.

The advantage of sub-cycle averaging is twofold:

- The switching signals cannot only be binary signals representing the closed position (s=1) and open position (s=0) of the device, but they can also be short-term average values (0≤s≤1) representing the relative on-time or duty cycle of the device within a simulation step. This increases the fidelity of the simulation if the switching signals are acquired with a smaller sampling interval than the simulation step.
- Each inverter bridge model only requires two diodes as switching elements, regardless of the actual number of semiconductors. Even multilevel topologies can be modeled with only two switching elements per phase.

Figure 5:
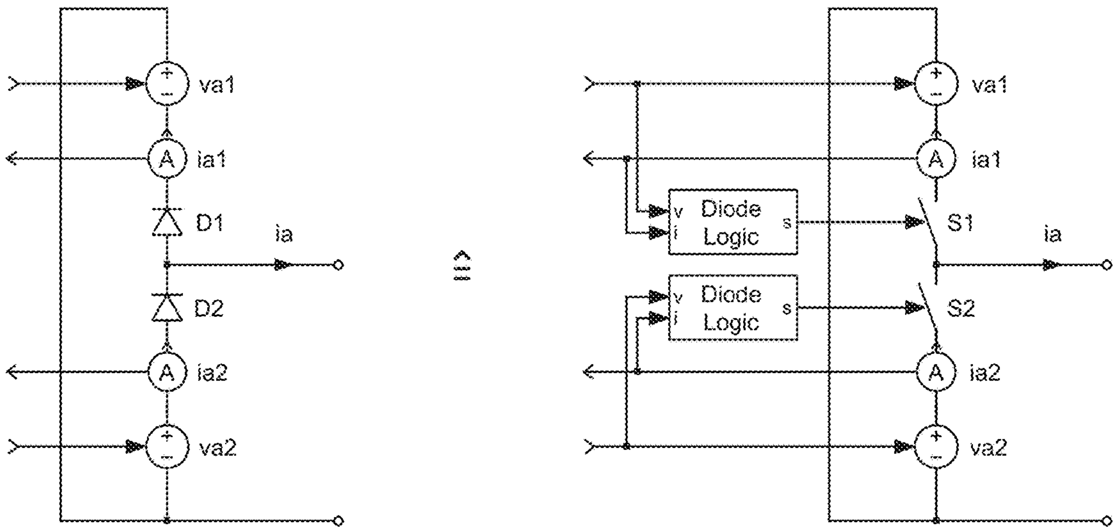
FIG. 5 a half-bridge model implementation of series-connected diodes with two ideal switches, FIG. 6 a half-bridge model implementation of series-connected diodes with two discrete-time approximate switches, FIG. 7 a half-bridge with open high-side switch and its equivalent circuit diagram for discrete-time approximate switch models, FIG. 8 a half-bridge with open low-side switch and its equivalent circuit diagram for discrete-time approximate switch models, FIG. 9 a half-bridge with both switches open and its equivalent circuit diagram for discrete-time approximate switch models, FIG. 10 an open-loop controlled single-phase inverter with constant DC link voltage, FIG. 11 current and voltage waveforms with two approximate switch models in each half-bridge, FIG. 12 a half-bridge consisting of two individual switches S1 and S2 along with an equivalent implementation comprising a control logic controlling one single switch, FIG. 13 a half-bridge consisting of IGBTs along with its equivalent implementation comprising a control logic controlling one single switch, FIG. 14 a half-bridge consisting of thyristors along with its equivalent implementation comprising a control logic controlling one single switch, FIG. 15 a half-bridge consisting of diodes along with its equivalent implementation comprising a control logic controlling one single switch, FIG. 16 a control logic comprising a state machine controlling a single ideal switch, FIG. 17 a state machine diagram for controlling a single ideal switch, FIG. 18 a half-bridge consisting of diodes along with its equivalent implementation comprising a control logic controlling one single discrete-time approximate switch, FIG. 19 a control logic comprising a state machine controlling a single discrete-time approximate switch, FIG. 20 a state machine diagram for controlling a discrete-time approximate switch, FIG. 21 another state machine diagram for controlling a discrete-time approximate switch, FIG. 22 current and voltage waveforms with single discrete-time approximate switch in each half-bridge, FIG. 23 detailed comparison of voltage waveforms for different half-bridge models: Double diode versus single discrete-time approximate switch, FIG. 24 a three-phase diode rectifier with DC voltage load, FIG. 25 current and voltage waveforms, FIG. 26 current and voltage waveforms, FIG. 27 a discrete-time approximate switch model for switch in closed position, FIG. 28 a discrete-time approximate switch model for switch in open position, FIG. 29 current and voltage waveforms, FIG. 30 a switch model with an open-state controller, FIG. 31 current and voltage waveforms, FIG. 32 a switch model with an open-state controller, and FIG. 33 a switch model with an open-state controller.
Figure 6:
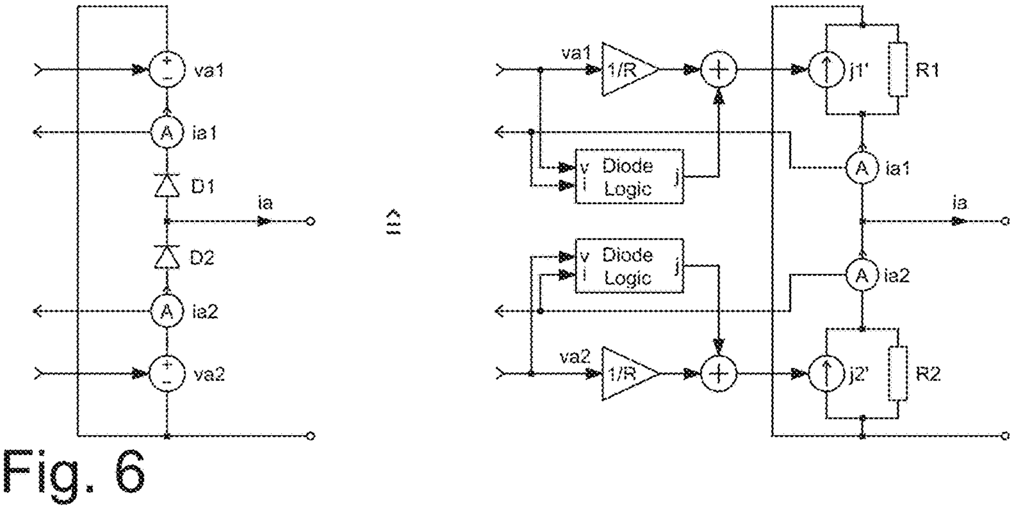

Double diodes with controlled voltage sources are the critical part in all half-bridge models since this part of the circuit includes two nonlinear switching elements. The diodes can be implemented using ideal switches as illustrated in FIG. 5 or with approximated switches as illustrated in FIG. 6. The diode logic is similar for both implementations: the switch closes when the voltage across the diode (from anode to cathode) is positive; it opens when the current through the diode becomes negative.

However, the implementation with two diodes suffers from the following shortcomings:

If ideal switches are employed, adding a half-bridge to a circuit would triple the number of system matrices. Since both diodes should never conduct simultaneously, the case where both switches are closed can be excluded. Thus, three valid combinations of switch positions may occur during the simulation. To simulate a three-phase converter system with grid- and machine-side inverters and a brake chopper, already 7 half-bridges and thus $3^7=2187$ sets of matrices are needed, which can already exceed the limits of memory capacity.

Figure 7:
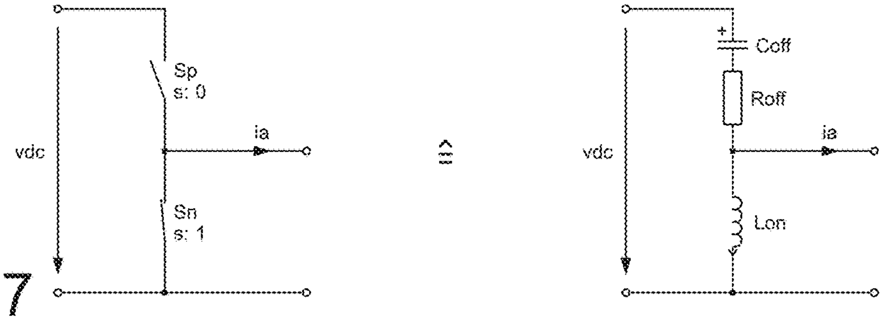
Figure 8:
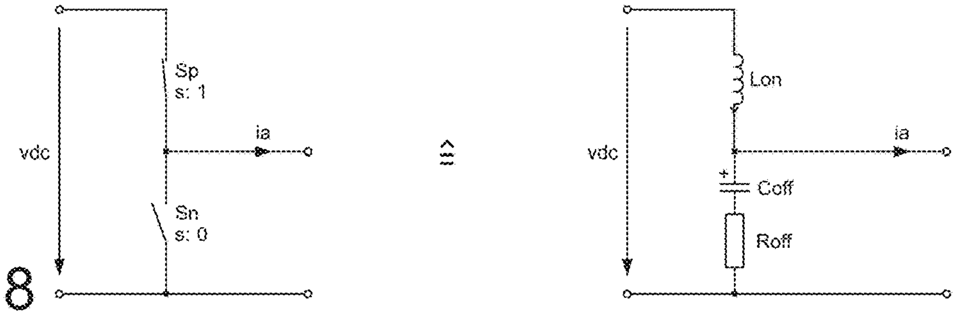
Figure 9:
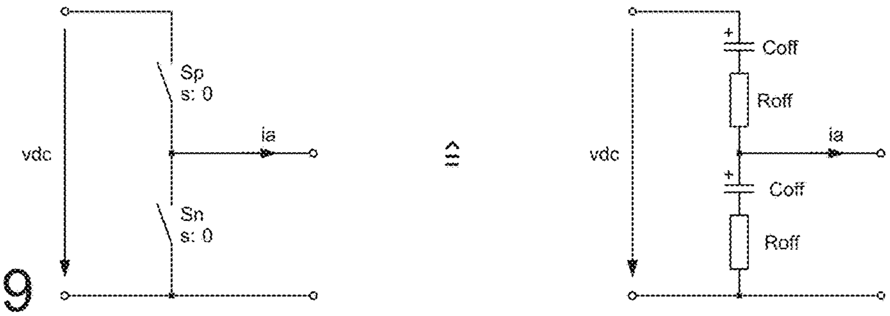

If approximate switch models are used, the switches in the open position, which represent blocking diodes, behave like a small capacitor, possibly in series with a resistor. In a half-bridge connected to a DC voltage source, at any point in time at least one of the two switches must be in the open position. The capacitors form resonators with the small inductors representing the closed switches and with other inductors in the circuit. These resonators are excited by sudden voltage changes in the controlled sources. FIGS. 7, 8 and 9 illustrate half-bridges with switches in different positions together with their equivalent circuit diagrams for discrete-time approximate switch models.

Figure 10:
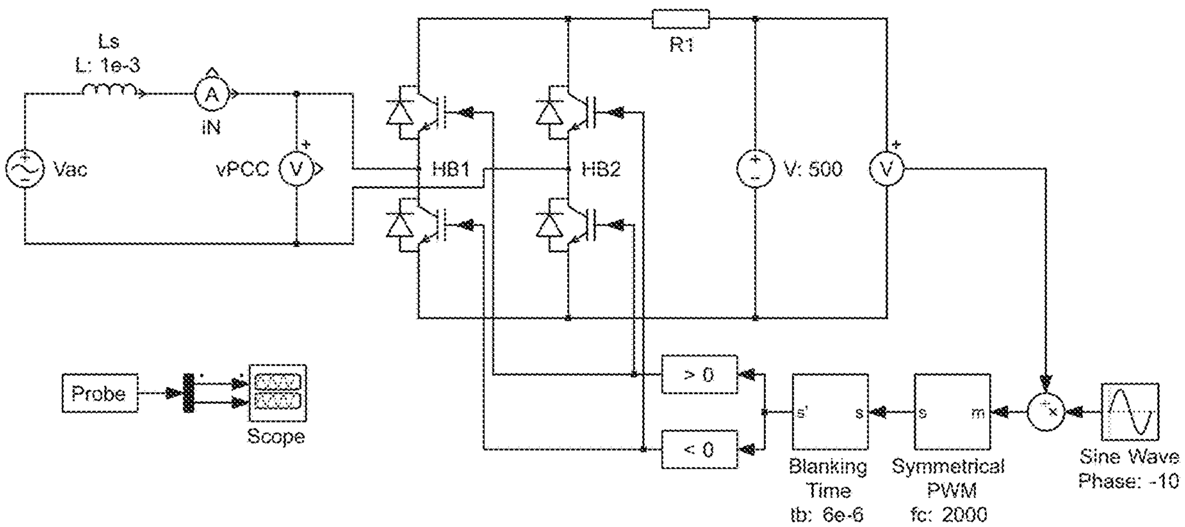
Figure 11:
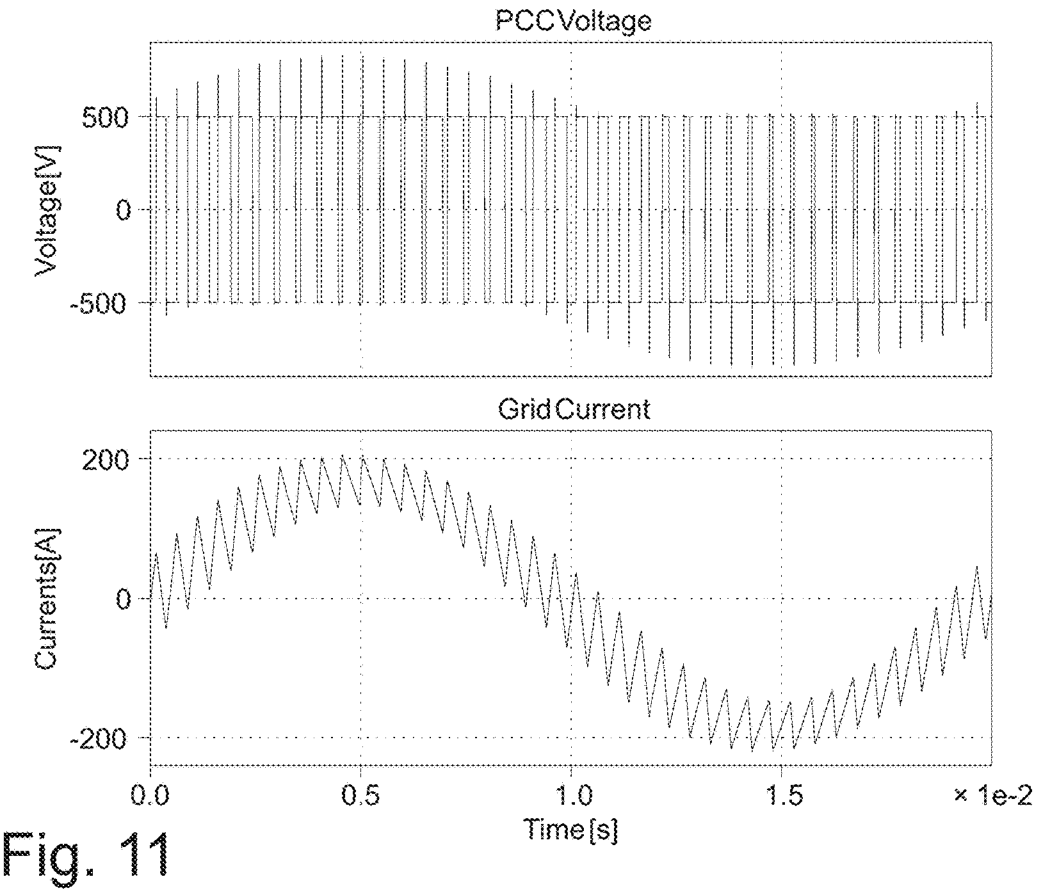

As an example, let us consider the single-phase voltage source inverter with a constant DC link voltage shown in FIG. 10. FIG. 11 shows the voltage and current waveforms at the point of common coupling (PCC) obtained from a fixed-step simulation. In this simulation, the inverter is modeled with two sub-cycle average half-bridges each containing two approximate switches according to FIG. 6. The spurious oscillations resulting from the equivalent capacitors can be observed as spikes in the PCC voltage. In an ideal simulation, the PCC voltage would appear as a square wave.

According to the invention the idea is to simulate a half-bridge having at least two switching elements by means of a single on/off switch and a single variable voltage source. This modeling approach implies that at any time not more than one of the switching elements may be closed. The switching elements in the original half-bridge can be connected in series with independently controllable voltage sources, which in turn are connected to a common port at their other end.

Figure 12:
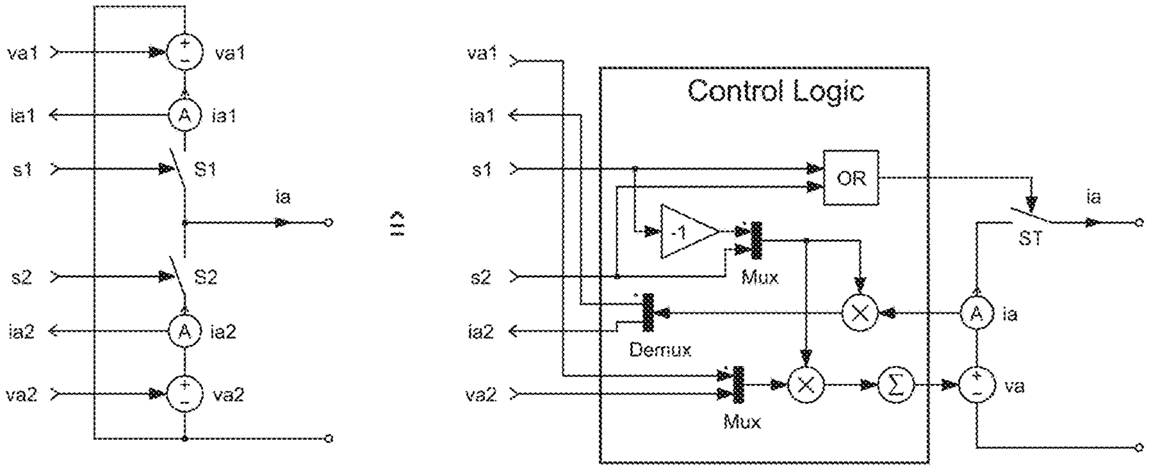

FIG. 12 shows a half-bridge realized with two individual switches S1 and S2 along with the equivalent control logic controlling one single switch. The binary control signals s1 and s2 for the individual switches are used in the equivalent model to control the single on/off switch ST and compute the corresponding voltage and current signals.

Figure 13:
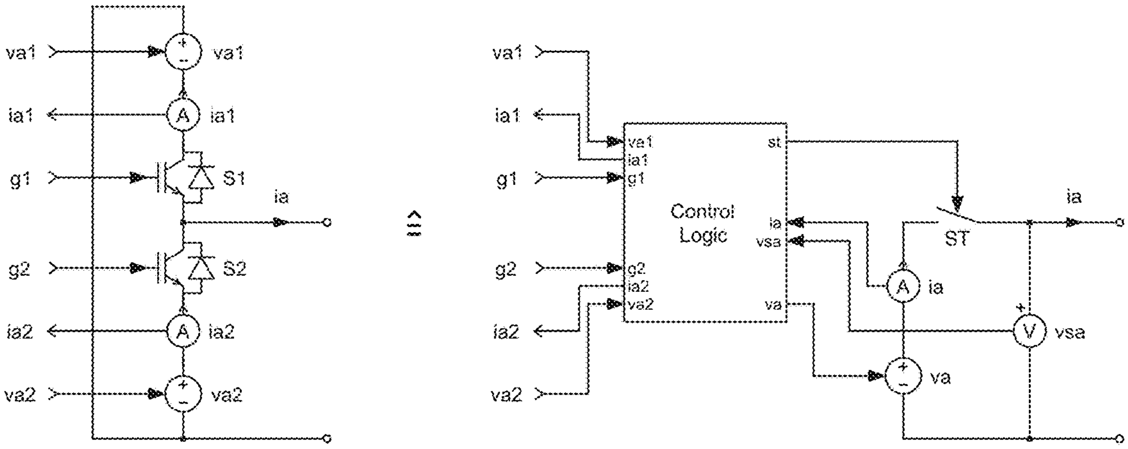

In most applications of a half-bridge, the switching elements are power semiconductors such as diodes, thyristors, MOSFETs, and IGBTs. Their switch positions (open or closed) depend on internal and/or external switching conditions. External switching conditions are gate signals, while internal switching conditions depend on measurements in the circuit such as the voltage across the switch and the current through the switch. FIG. 13 shows a half-bridge consisting of IGBTs along with its equivalent control logic controlling one single switch.

In the equivalent model, the position of the single on/off switch ST and the applied voltage va are controlled by the control logic based on the original gate signals g1 and g1 for the IGBTs and the individual voltage sources va1 and va2. Depending on the original conduction state of the IGBTs, the control logic computes the currents ia1 and ia2 that would flow in the original circuit.

Figure 14:
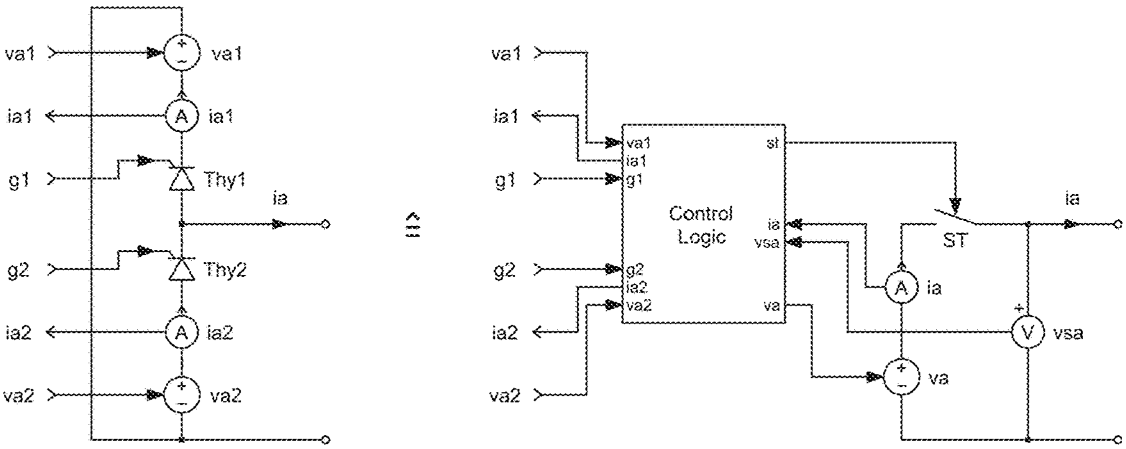

FIG. 14 shows a different application where the switching elements are thyristors.

One important application is the simulation of two anti-parallel diodes, each of which is connected in series with an independently controlled voltage source. This double diode forms the central element of inverter half-bridges simulated using sub-cycle averaging. As with other half-bridge applications, the single on/off switch ST in the equivalent model can be implemented as an ideal switch or as a discrete-time approximate switch.

Figure 15:
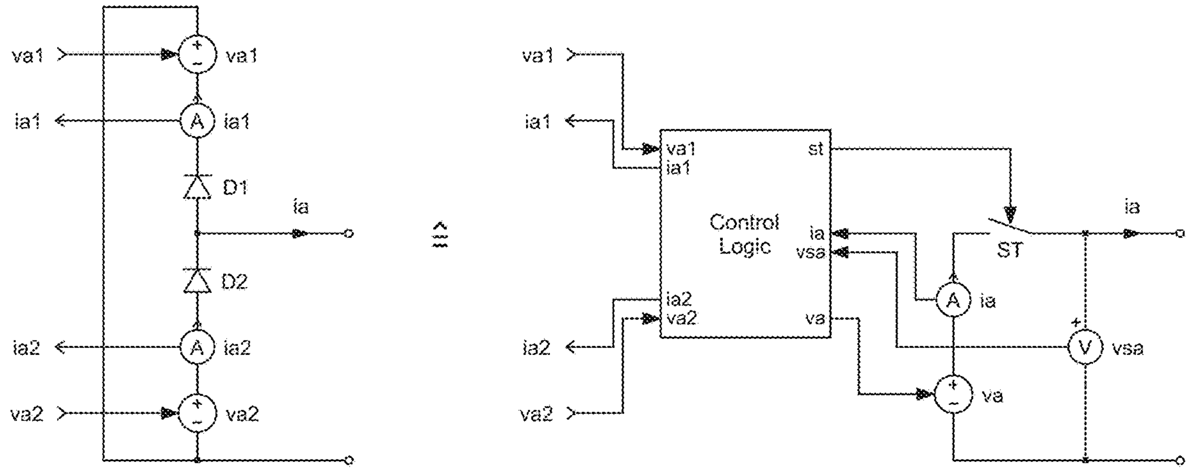

FIG. 15 shows the equivalent model using an ideal switch with a series-connected voltage source.

Figure 16:
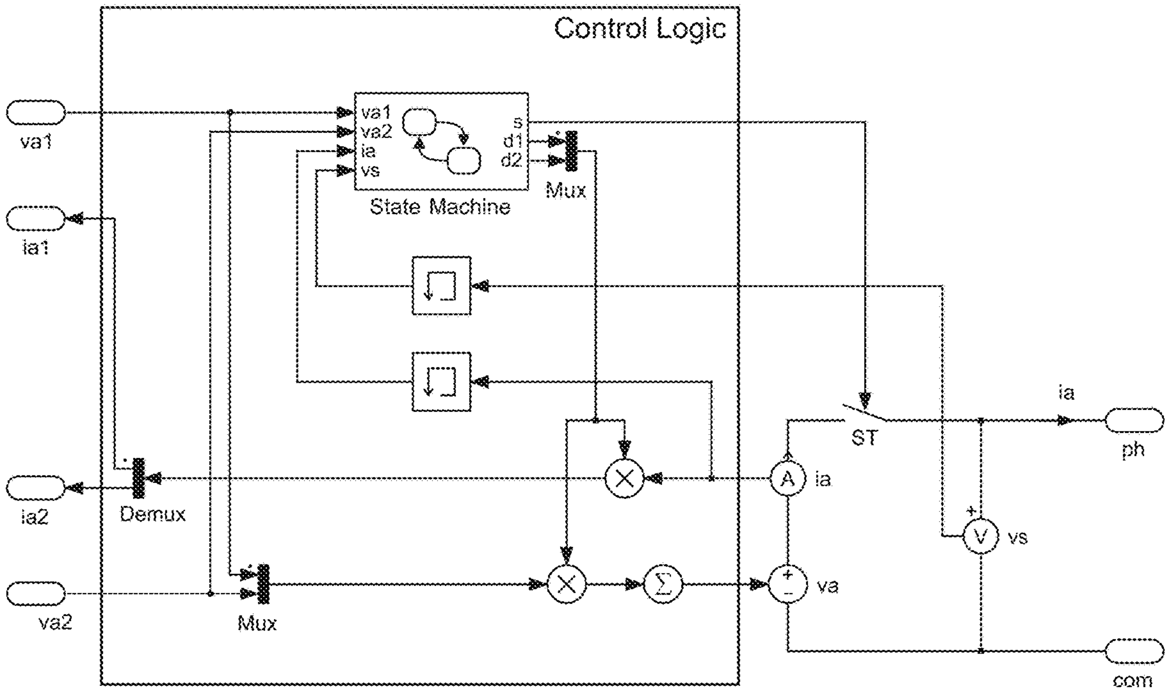

The switching logic for the two individual diodes and the control signals for the individual voltage sources are combined into the control logic that controls the single switch and the single variable voltage source. FIG. 16 illustrates a possible implementation of the control logic for an ideal switch. The implementation is based on a signal flow diagram including a state machine. The control logic includes an internal state variable that indicates which of the two original diodes is currently conducting, or if both diodes are blocking.

As long as one of the two diodes is conducting, the switch is closed and the corresponding voltage signal is applied to the voltage source. As soon as the measured switch current changes its direction or becomes zero, the conduction states of the diodes change and thus also the state variable in the control logic.

When both diodes are blocking, the single switch is in the open position and the voltage across the switch is monitored. As soon as the switch voltage exceeds one of the two externally applied voltage signals in a way that a positive or negative current would start flowing through one of the original diodes, the state variable in the control logic reflects this change and the switch is closed.

Figure 17:
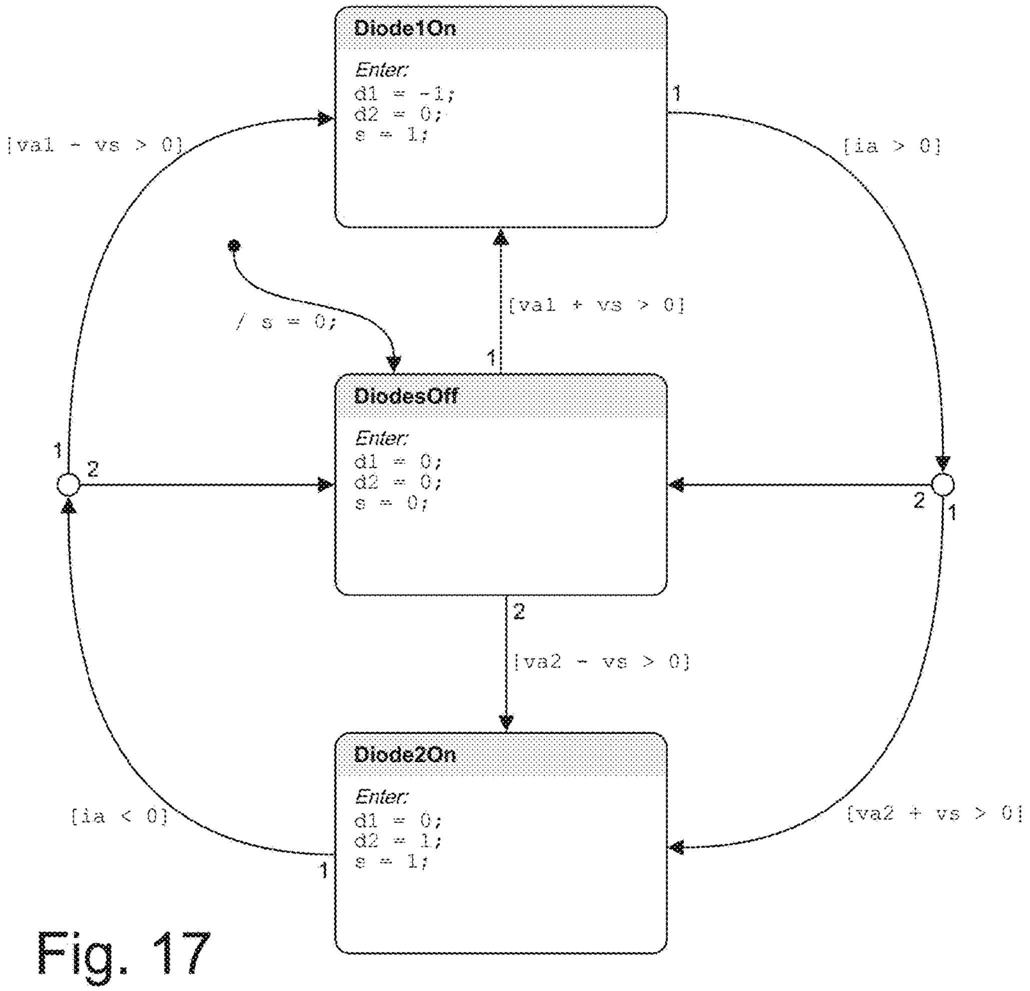

FIG. 17 shows the state-machine diagram used for the control logic. It comprises three states (upper diode D1 on, lower diode D2 on, both diodes off). Besides transitions where a single diode turns on or off, branched transitions allow direct commutation from the upper diode to the lower one and vice versa.

Figure 18:
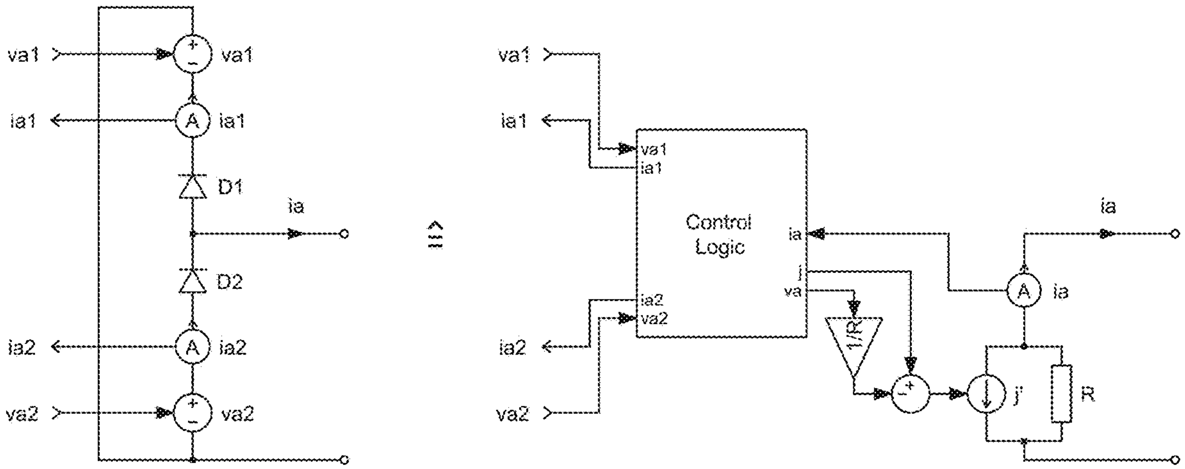

FIG. 18 shows a circuit diagram for a discrete-time approximate switch model consisting of a resistor and a current source in parallel. Here, the independent voltage sources can be expressed as a current source and integrated with the existing source of the switch model.

Figure 19:
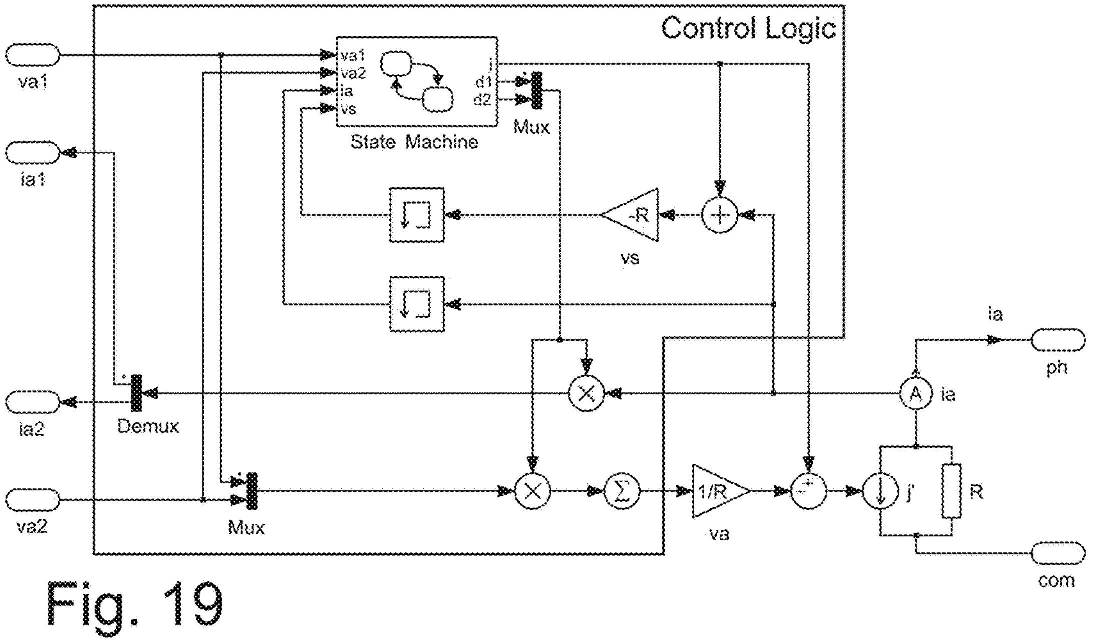

FIG. 19 illustrates a possible implementation of the control logic for a discrete-time approximate switch. The implementation is based on a signal flow diagram including a state machine.

The inputs to the state machine are the control signals for the independent voltage sources va1 and va2, the measured switch current ia and the computed voltage across the switch $$v_s = -R(i_a + j) \tag{10}$$

that excludes the independent source voltage. The switch current ia and voltage vs are taken from the previous time step. The outputs of the state machine are the current signal j to control the approximate switch and the conduction states d1 and d2 of the two diodes.

Figure 20:
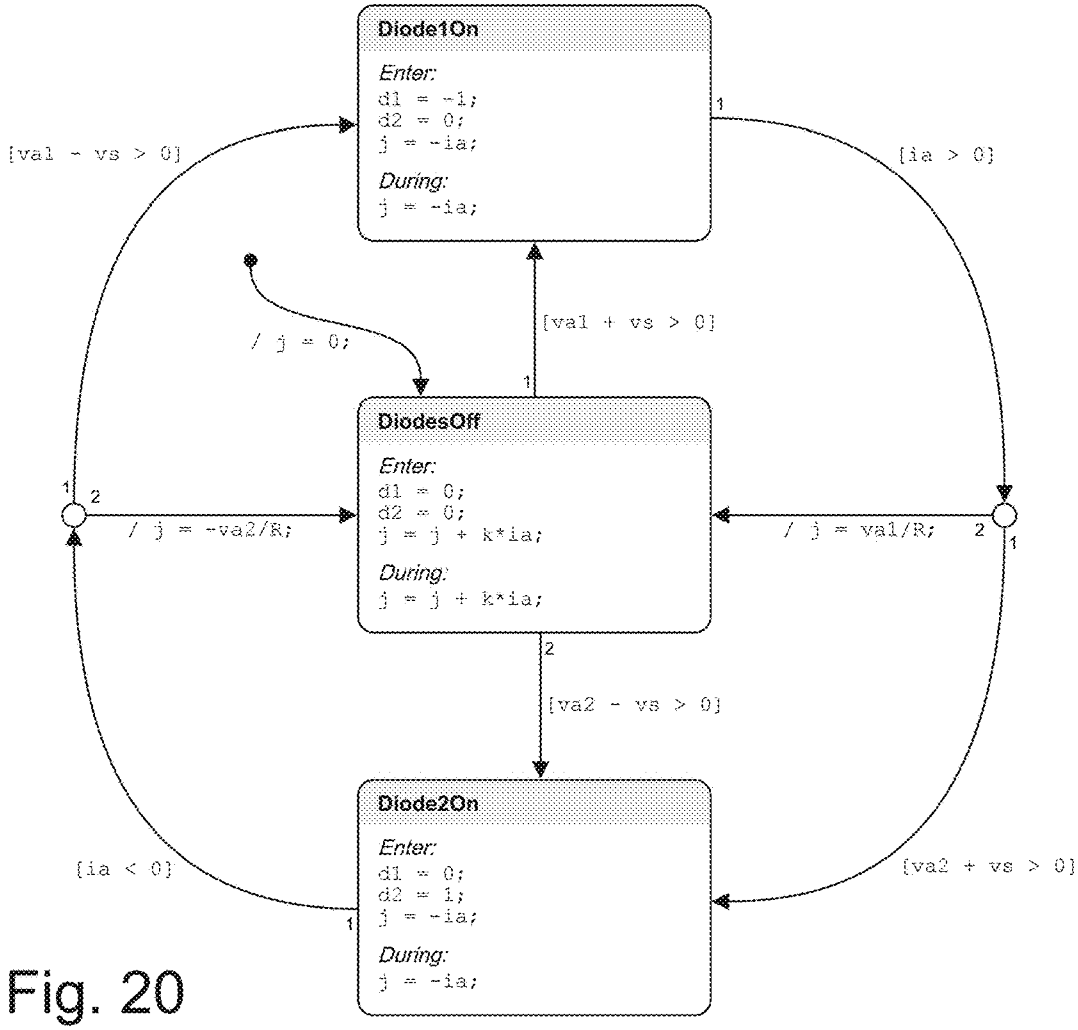

The complete state machine diagram is shown in FIG. 20. It comprises three states (upper diode D1 on, lower diode D2 on, both diodes off). Besides transitions where a single diode turns on or off, branched transitions allow direct commutation from the upper diode to the lower one and vice versa.

Figure 21:
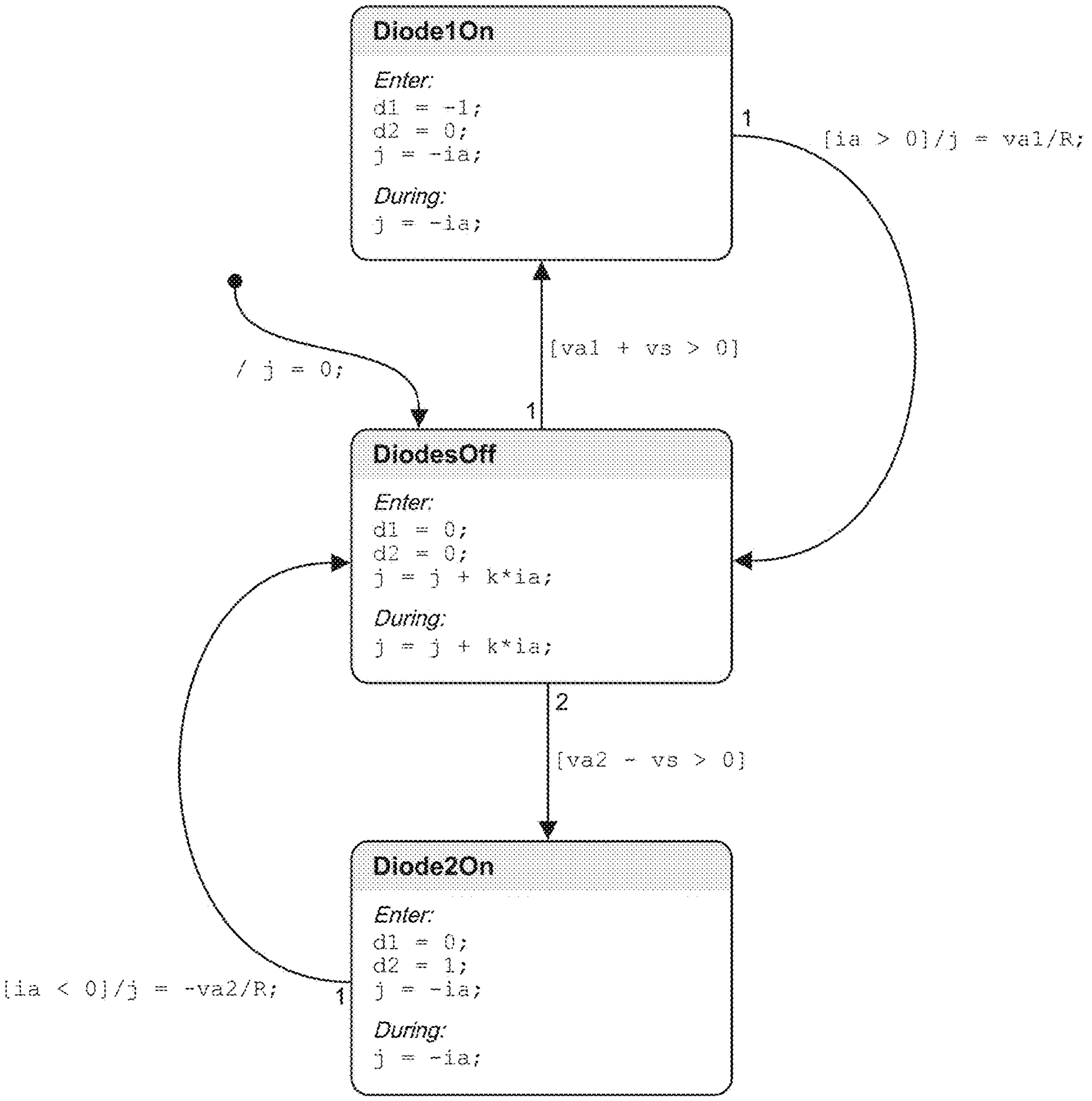

FIG. 21 shows an alternative version of the state machine diagram where the direct commutation transitions are omitted.

Figure 22:
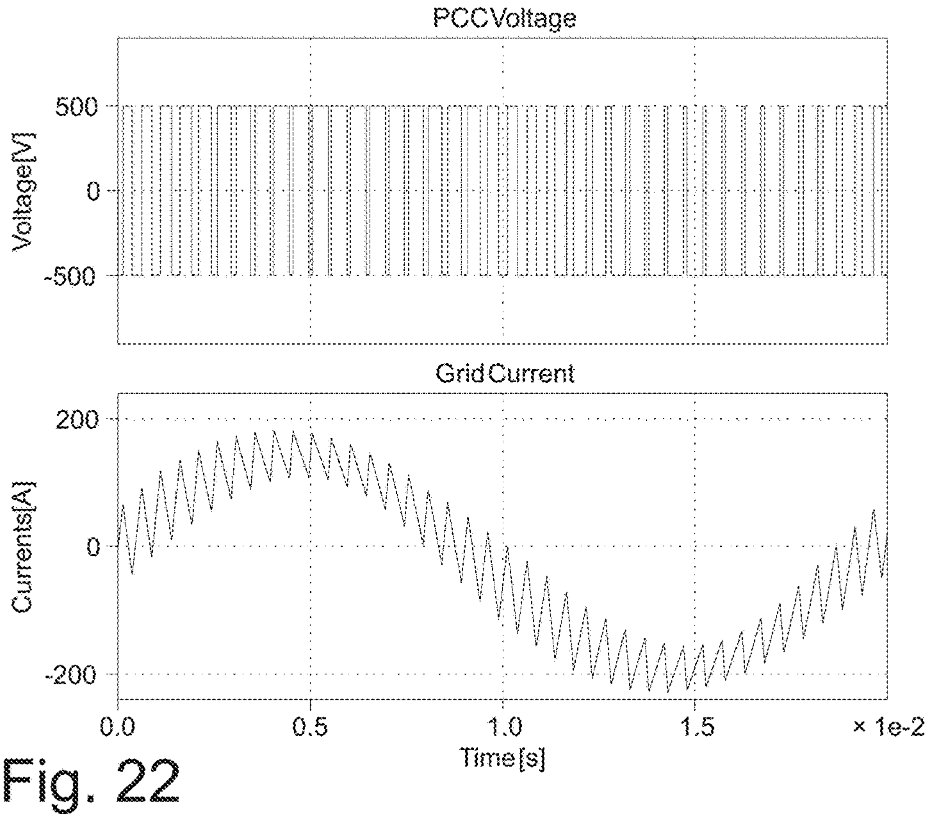
Figure 23:
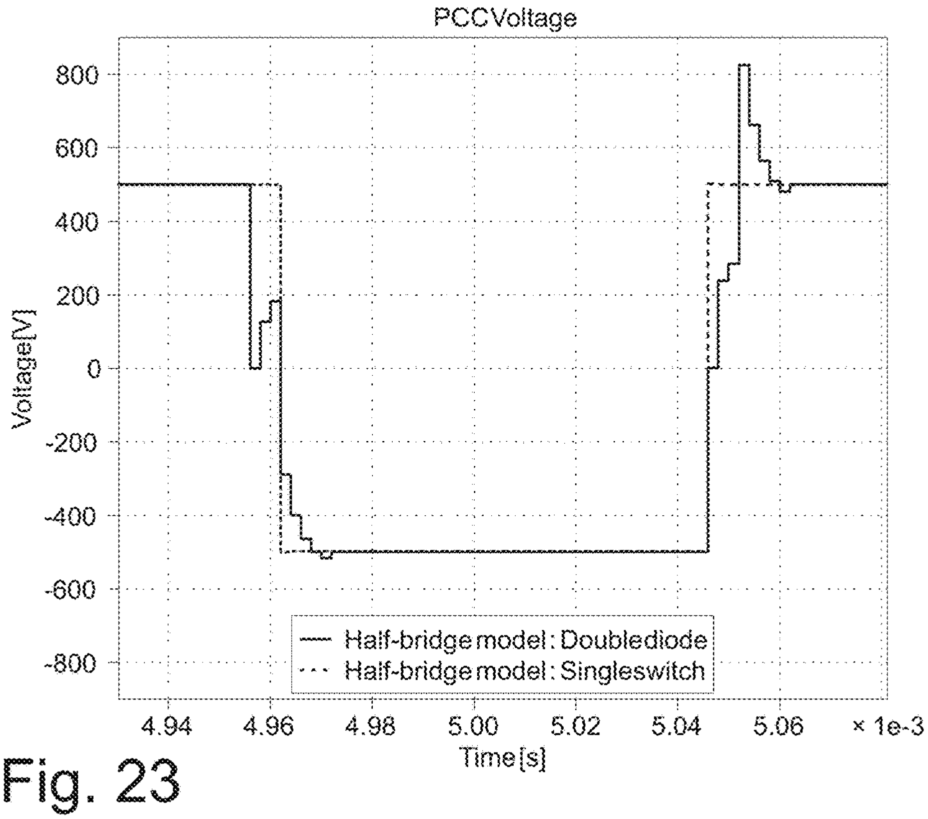

If the inverter from FIG. 10 is simulated with half-bridge models each containing a single discrete-time approximate switch, the results shown in FIG. 22 are obtained. In contrast to the results in FIG. 11 the PCC voltage does not exhibit spikes, but presents itself as a square wave. FIG. 23 shows an excerpt in which the voltage waveforms obtained from both simulations are superimposed during a single pulse. With the single switch implementation, all spurious oscillations are eliminated.

To further reduce the oscillations mentioned above when both switching elements of the half-bridge are in the open position, the one single switch may also be modeled by an equivalent circuit comprising a fixed-value resistor and at least one of a controlled current source or a controlled voltage source, wherein the single switch is able to attain an open position and a closed position and the open position is simulated by means of an open-state controller, wherein the open-state controller is configured to control the current or voltage source and the open-state controller comprises a filter.

This open-state controller is explained in more detail in the following.

Figure 24:
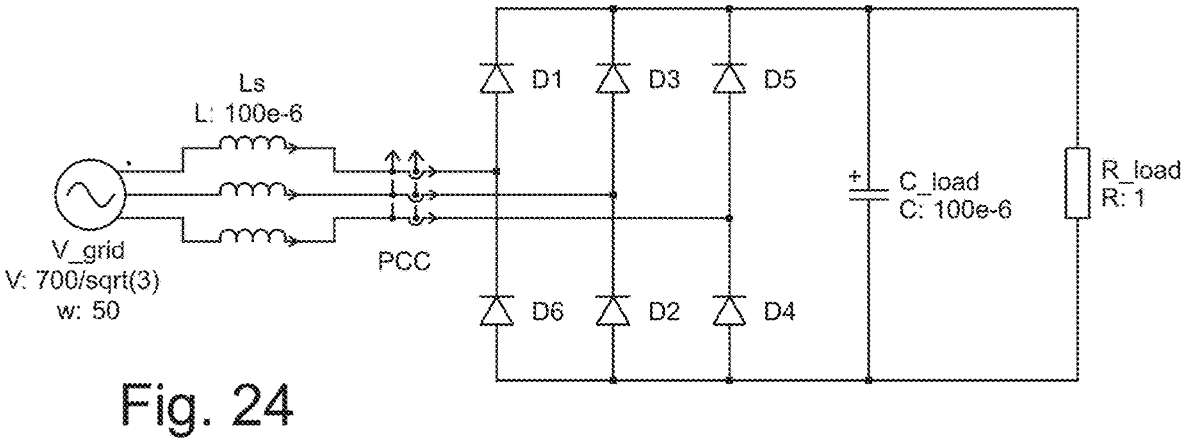
Figure 25:
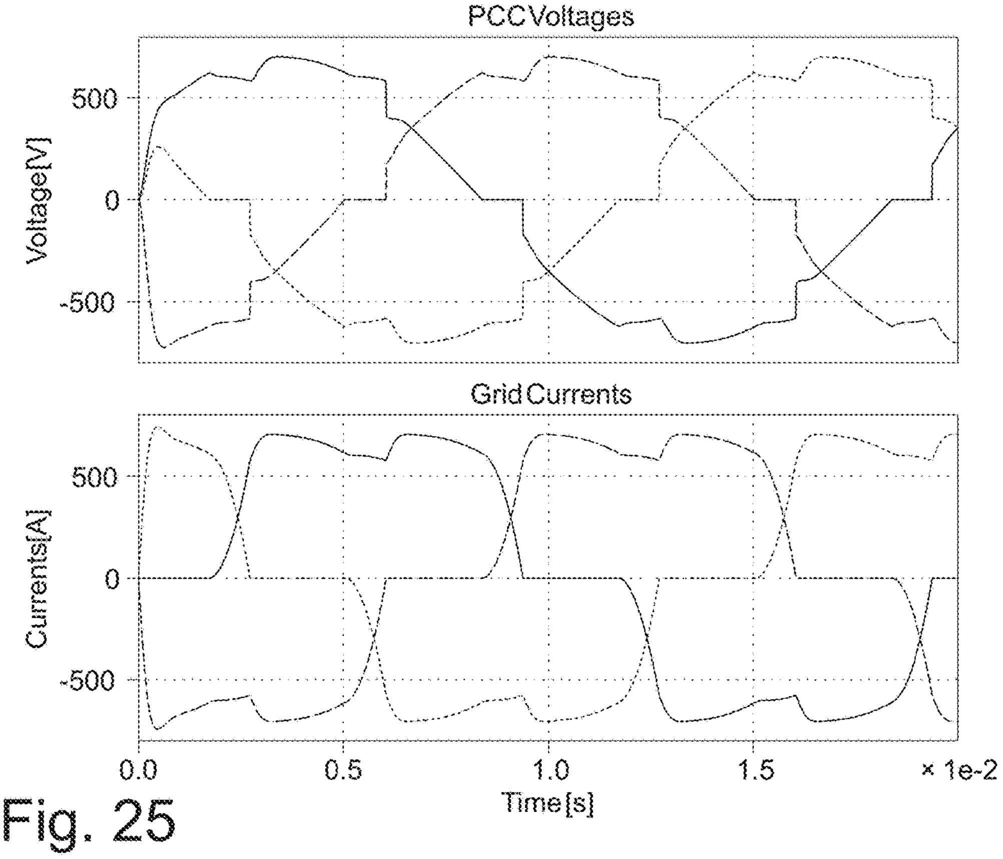

For the explanation of the oscillations let us consider a three-phase diode rectifier D1 . . . D6 with a capacitive DC load C_load shown in FIG. 24. FIG. 25 shows current and voltage waveforms at the point of common coupling (PCC) of the three-phase network obtained from a desktop simulation with diodes D1 . . . D6 modeled as ideal instantaneous switches.

Figure 26:
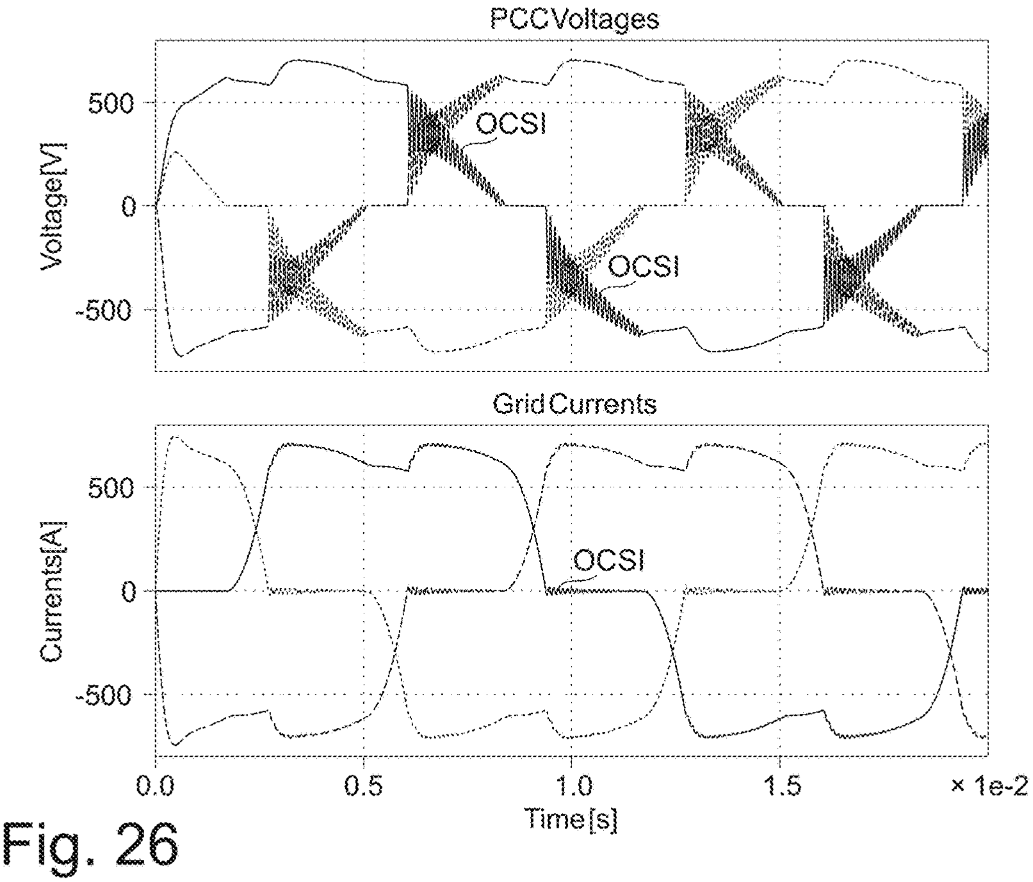

FIG. 26 shows the simulation result if an approximate switch model according to Eqn. 3 with R=1Ω and a fixed simulation time step of 1 μs is used. It can be seen that the voltages and currents are distorted by oscillations OSCI.

Figure 27:
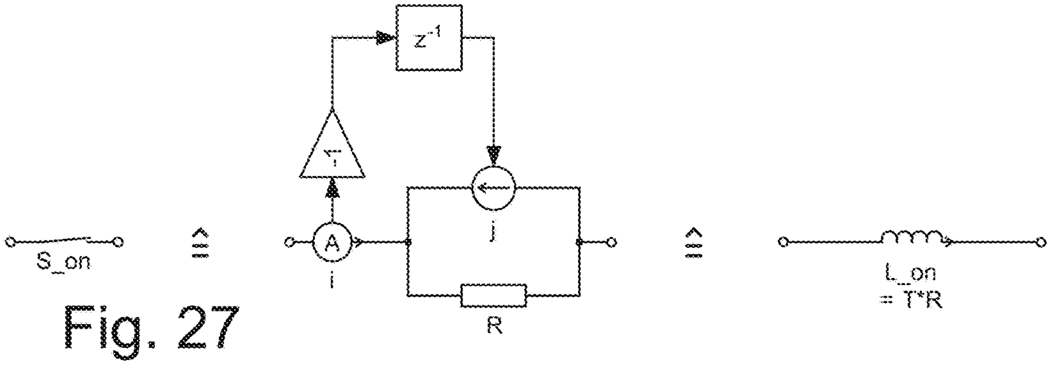

FIG. 27 illustrates the implementation of a switch S in the closed position, which may also be named closed state, using Eqn. 5.

Figure 28:
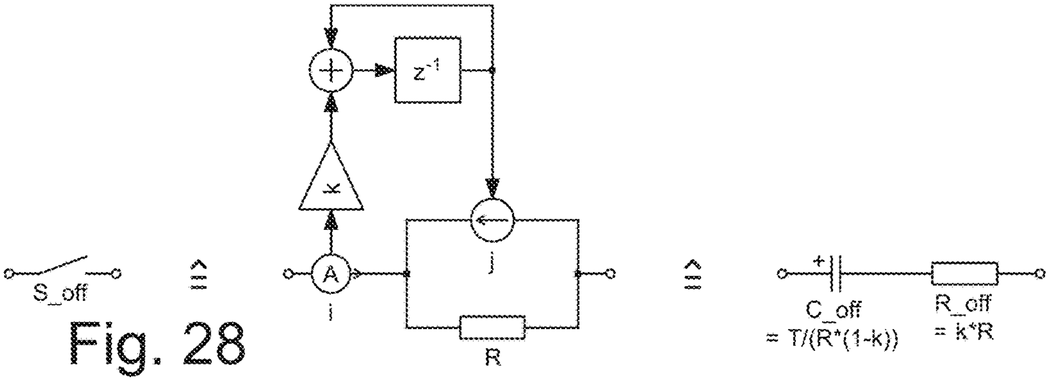

FIG. 28 illustrates the implementation of a switch S in the open position, which may also be named open state, using the update rule from Eqn. 5. The unit delay $z^{-1}$ is referred to the simulation time step T. Both FIGS. 27 and 28 also show the equivalent electrical circuit.

Figure 29:
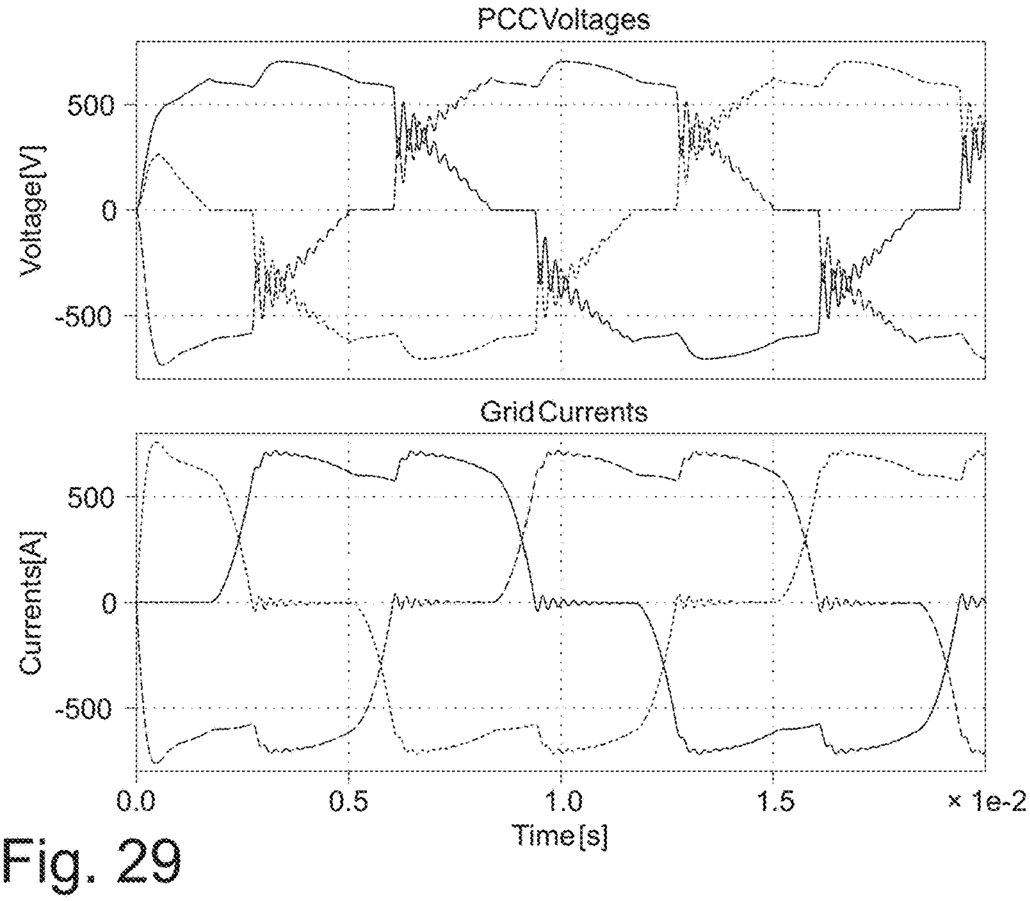

FIG. 29 shows the simulation result for the diode rectifier using approximate switch models according to Eqn. 5 with k=0.2. All other parameters correspond to those used for FIG. 26. Thanks to the damping, the magnitude of the excited oscillations decays faster than in FIG. 26. However, since 80% of the resistance R is already used for damping purposes, a significantly higher damping cannot be achieved without increasing the value of R. Another effect of the damping is that the equivalent capacitance $C_{off}$ has become 5 times larger than before. This shifts the oscillations to lower frequencies where they are more difficult to mitigate with a low-pass filter. With this approach, damping and oscillation frequencies can only be adjusted within a small range and not independently of each other.

In order to further reduce the spurious oscillations, a new high order update rule is proposed here for controlling the current source when the switch is in the open position. The discrete integrator $j_{n+1}=ki_n+j_n$ from Eqn. 5 is augmented with the described open-state controller OSC.

Figure 30:
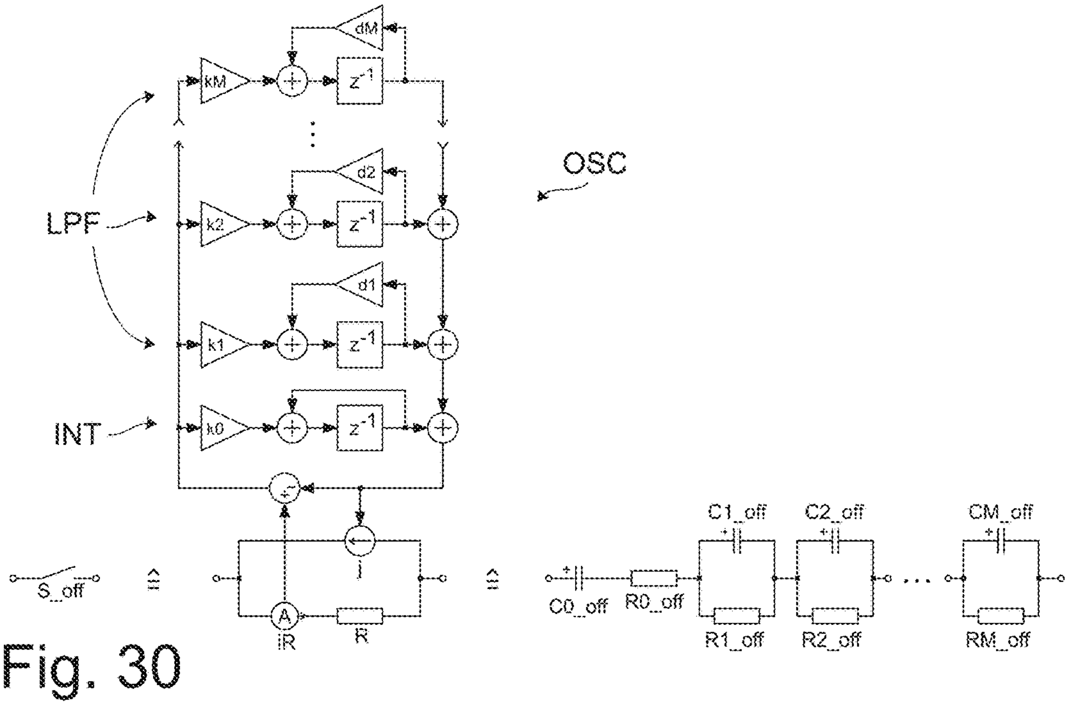

One implementation of the open-state controller OSC comprises a parallel connection of an integrator INT and low-pass filters LPF with different cut-off frequencies as illustrated in FIG. 30. The electrical behavior of the switch in the open position now corresponds to a capacitance $C_{0,off}$ connected in series with capacitors $C_{m,off}$ individually connected in parallel to resistors $R_{m,off}$.

The gains $k_m$ of the integrator INT and the individual low-pass filters LPF determine the size of the capacitors $C_{m,off}$ in the equivalent circuit:

$$C_{m,off} = \frac{T}{k_m R} \tag{11}$$

For stability reasons, it is advantageous if the sum of all gains is between 0 and 2:

$$\sum_{m=0}^{M} k_m \in (0, 2) \tag{12}$$

For a good performance independent of the remaining circuit configuration, it is advantageous that the sum of all gains is in the range of 1:

$$\sum_{m=0}^{M} k_m \approx 1 \tag{12}$$

The values of the resistors $R_{m,off}$ in the equivalent circuit can be calculated from the damping coefficients $d_m$ as $$R_{m,off} = k_m R \frac{d_m}{1 - d_m} \tag{13}$$

The cut-off frequencies $\omega_m$ of the individual low-pass filters are hence:

$$\omega_m = \frac{1}{T}\left(\frac{1}{d_m} - 1\right) \tag{14}$$

In order to attenuate oscillations over a wide frequency range, it is advantageous to distribute the cutoff frequencies $\omega_m$ logarithmically across the frequency range of interest and to use similar gains $k_m$ for all filters.

As an example, the update rule has been configured with the parameters listed in Tab. 1.

| m | $k_m$ | $d_m$ |
|---|---|---|
| 0 | 0.2 | — |
| 1 | 0.2 | 1 1/4 |
| 2 | 0.2 | 1 1/16 |
| 3 | 0.2 | 1 1/64 |
| 4 | 0.2 | 1 1/256 |

Figure 31:
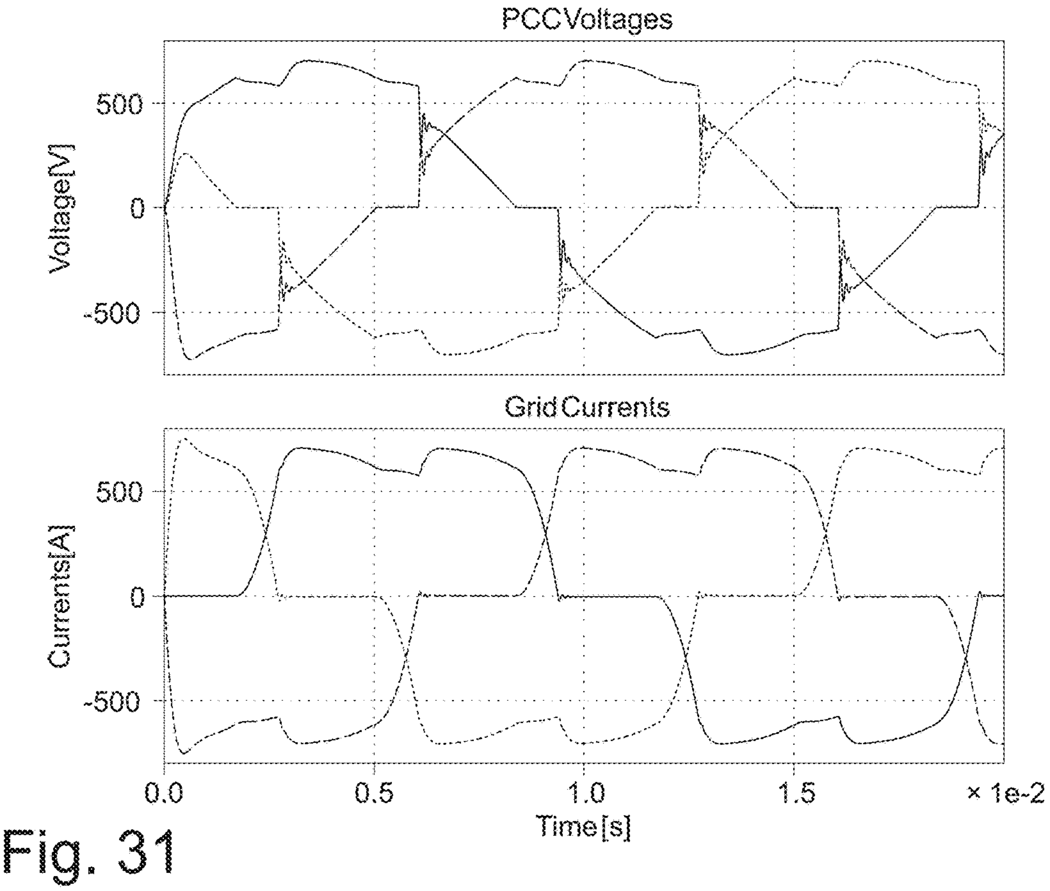

The simulation results with a simulation time step T=1 μs are shown in FIG. 31. It can clearly be seen that the spurious oscillations are significantly reduced compared to the implementations previously presented. In contrast to the other optimization techniques, this new update rule realized by the open-state controller does not need to be adapted to a particular circuit and is robust against parameter variations.

Figure 32:
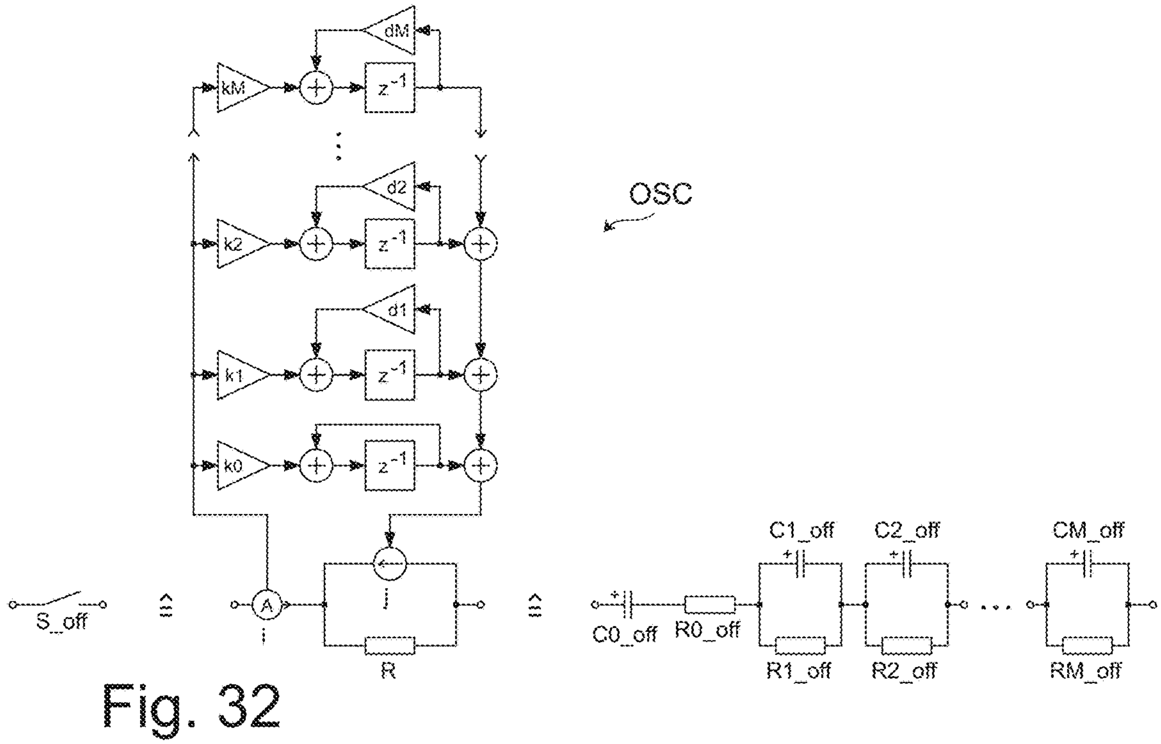

FIG. 32 shows another implementation of the open-state controller. The open-state controller of FIG. 32 is essentially corresponding to the open-state controller described above with respect to FIG. 30. The only difference is that the current measurement for the input of the open-state controller is connected in series with the current source j.

Figure 33:
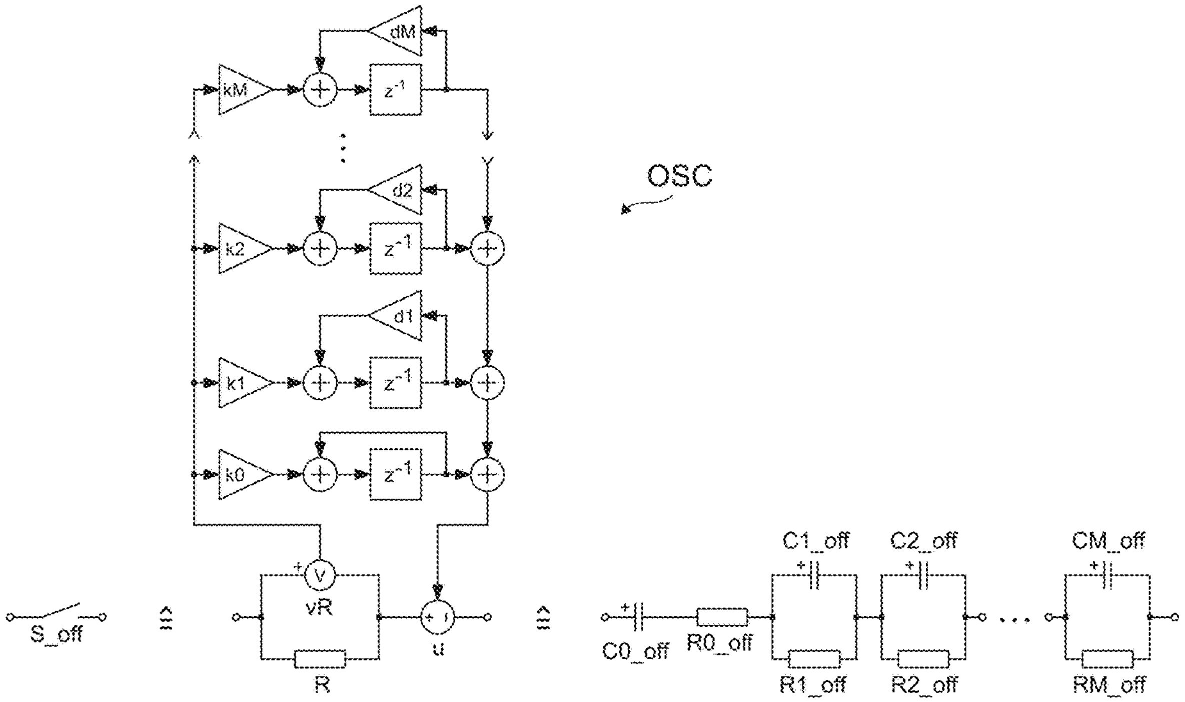

FIG. 33 shows another implementation of the open-state controller. The open-state controller of FIG. 34 is essentially corresponding to the open-state controller described above with respect to FIG. 30. The difference is that instead of a current measurement a voltage measurement is used for the input of the open-state controller which is in parallel with the resistor R. Further, the output of the open-state controller controls a voltage source which is connected in series with the voltage measurement and the resistor.

The invention claimed is:

1. A method for simulating an electrical circuit, wherein the electrical circuit comprises at least one half-bridge and at least one other component, wherein the half-bridge and the at least one other component interact with each other, said half-bridge comprises two switching elements, each of the two switching elements is able to attain an open position and a closed position, at most one of the two switching elements is in the closed position at any time, the at least one half-bridge is modeled by a control logic, only one single switch (ST) and a variable voltage source, wherein the control logic controls the one single switch (ST) and the variable voltage source, the control logic is able to attain three different states for simulating the interaction between the half-bridge and the other component, wherein the method comprises determining a current and/or voltage of the electrical circuit by means of the control logic, the one single switch (ST) and the variable voltage source.

2. The method of claim 1, wherein the single switch (ST) is modeled by means of an ideal switch model.

3. The method of claim 1, wherein the single switch (ST) is modeled by means of a discrete-time approximate switch model.

4. The method of claim 1, wherein during the determining of the current and/or voltage a change of a currently active state of the three different states in the control logic is performed based on a voltage condition and/or current condition in the electrical circuit.

5. The method of claim 1, wherein during the determining of the current and/or voltage a change of a currently active state of the three different states in the control logic is performed based on an external control signal.

6. The method of claim 5, wherein during the determining of the current and/or voltage a change of a currently active state of the three different states in the control logic is performed based on multiple external control signals, wherein each external control signal represents a signal that controls one distinct switching element of the switching elements of the half-bridge.

7. The method of claim 1, wherein the switching elements of the half-bridge are representative for power semiconductors and the three different states of the control logic simulate a first state in which a first semiconductor for simulating the half-bridge is in the open position and a second semiconductor for simulating the half-bridge is in the closed position, a second state in which the first semiconductor is in the closed position and the second semiconductor is in the open position, and a third state in which the first semiconductor and the second semiconductor are in the open position.

8. The method of claim 1, wherein the switching elements of the half-bridge are representative for diodes.

9. The method of claim 1, wherein the control logic comprises a state machine for attaining the three different states.

10. The method of claim 1, wherein the control logic comprises one or more voltage inputs and, depending on a currently active state of the three different states of the control logic, the control logic applies one of the voltage inputs with a corresponding polarity to the variable voltage source.

11. The method of claim 1, wherein the control logic comprises one or more current outputs and, depending on a currently active state of the three different states of the control logic, the control logic applies a current value with a corresponding polarity to one of the current outputs, wherein the current value is a current measured through the single switch.

12. The method of claim 1, wherein the single switch (ST) is modelled by an equivalent circuit comprising a fixed-value resistor and at least one of a controlled current source or a controlled voltage source, the single switch (ST) is able to attain an open position and a closed position, the open position is simulated by means of an open-state controller (OSC), wherein the open-state controller (OSC) is configured to control the current or voltage source and the open-state controller (OSC) comprises a filter.

13. The method of claim 1, wherein the other component is one of the following:

a passive component or an active component.

14. A data processing apparatus comprising means for carrying out the method of claim 1.

15. A digital real-time simulator, wherein the digital real-time simulator comprises the data processing apparatus according to claim 14.

16. A non-transitory computer readable medium having stored thereon a program comprising instructions which, when the program is executed by a computer, cause the computer to carry out the method of claim 1.

* * * * *